(12) United States Patent
Pfister

(10) Patent No.: US 11,204,738 B1
(45) Date of Patent: Dec. 21, 2021

(54) APPARATUS AND METHOD FOR PERFORMING BIT PERMUTATION OPERATIONS

(71) Applicant: Arm Limited, Cambridge (GB)

(72) Inventor: Nicholas Andrew Pfister, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/891,366

(22) Filed: Jun. 3, 2020

(51) Int. Cl.
  *G06F 7/08* (2006.01)
  *G06F 5/01* (2006.01)

(52) U.S. Cl.
  CPC . *G06F 7/08* (2013.01); *G06F 5/01* (2013.01)

(58) Field of Classification Search
  CPC .......... G06F 7/06; G06F 7/08; G06F 9/30018; G06F 9/30032
  See application file for complete search history.

(56) References Cited

U.S. PATENT DOCUMENTS

| 5,471,628 | A  | * | 11/1995 | Phillips | G06F 7/762 712/223 |
| 6,381,690 | B1 | * | 4/2002  | Lee      | G06F 7/76 345/522 |
| 2003/0023646 | A1 | * | 1/2003 | Lin     | G06F 9/30167 708/209 |
| 2005/0038910 | A1 | * | 2/2005 | Zbiciak | G06F 9/30032 709/246 |
| 2009/0138534 | A1 | * | 5/2009 | Lee     | G06F 7/762 708/209 |

* cited by examiner

*Primary Examiner* — Chuong D Ngo
(74) *Attorney, Agent, or Firm* — Nixon & Vanderhye P.C.

(57) ABSTRACT

An apparatus and method are provided for performing bit permutation operations. The apparatus has an interface for receiving an input data operand and a control operand. The input data operand comprises one or more data elements, each data element comprising a plurality of bits, and the control operand provides control information identifying bit permutations required when performing a given bit permutation operation on each data element. The bit permute circuitry treats the input data operand as a plurality of fixed size data portions, each data element comprising one or more of the data portions with the number being dependent on the data element size. The bit permute circuitry performs bit permutation operations on each data portion of the input data operand, using the control information provided for that data portion, generating, for each data portion, at least one intermediate result. Result generation circuitry generates, from the intermediate results, a final result operand comprising one or more result elements, each result element providing the result of performing the given bit permutation operation on the corresponding data element of the input data operand. The result generation circuitry comprises a multi-level network of shifter circuits, shifter circuits at a first level performing shift operations using as inputs at least a subset of the intermediate results, and shifter circuits at each subsequent level performing shift operations using inputs derived from the outputs of the shifter circuits at a preceding level of the network. Control circuitry analyses the control information provided by the control operand in order to generate control signals that control the shift operations performed by the shifter circuits.

22 Claims, 15 Drawing Sheets

APPARATUS AND METHOD FOR PERFORMING BIT PERMUTATION OPERATIONS

BACKGROUND

The present technique relates to an apparatus and method for performing bit permutation operations.

It can be useful in data processing systems to support bit permutation operations, where individual bit values within a data element may be moved from one bit position to another. Often, control data is provided to identify which bits within the data element are to be moved.

Dedicated bit permute units may be provided to support such bit permutation operations. To improve throughput, such bit permute units may be arranged to handle vectors of data elements, and perform the required permutation on each of the data elements in the vector. It is often the case that such bit permute units occupy a relatively large area, which can increase the cost and complexity of a data processing system including such a bit permute unit, and indeed increase the power consumption. For example, a typical bit permute unit may include large and complex circuitry to deeply inspect and perform computations on the provided control data in order to construct control signals for output multiplexers that can select any bit from an input data vector and provide it to any bit in an output data vector. Whilst the provision of such large and complex circuitry can increase the speed of operation, it has a significant impact on area and cost of the bit permute unit.

However, attempts made to seek to reduce the size and complexity of the bit permute unit may result in much deeper logic, requiring multiple execute cycles to complete, and this can have a significant impact on latency.

Accordingly, it would be desirable to provide an area efficient design of bit permute unit, without unduly impacting the latency of operation, so as to facilitate its use within modern data processing systems.

SUMMARY

In one example arrangement, there is provided an apparatus comprising: an interface to receive an input data operand and a control operand, the input data operand comprising one or more data elements, where each data element comprises a plurality of bits, and the control operand providing control information used to identify bit permutations required when performing a given bit permutation operation on each data element of the input data operand; bit permute circuitry arranged to treat the input data operand as a plurality of data portions of a fixed size, each data element comprising one or more of the data portions, and the number of data portions forming each data element being dependent on a size of the data elements in the input data operand, wherein the bit permute circuitry is arranged to perform at least one bit permutation operation on each data portion of the input data operand, using the control information provided by the control operand for that data portion, in order to generate, for each data portion, at least one intermediate result; and result generation circuitry to generate, from the intermediate results output by the bit permute circuitry, a final result operand comprising one or more result elements, where each result element provides the result of performing the given bit permutation operation on the corresponding data element of the input data operand; wherein the result generation circuitry comprises a multi-level network of shifter circuits, where the shifter circuits at a first level of the network perform shift operations using as inputs at least a subset of the intermediate results, and the shifter circuits at each subsequent level of the network perform shift operations using inputs derived from the outputs of the shifter circuits at the preceding level of the network; and the apparatus further comprises control circuitry to analyse the control information provided by the control operand in order to generate control signals used to control the shift operations performed by the shifter circuits.

In another example arrangement, there is provided a method of performing bit permutation operations in an apparatus comprising: receiving an input data operand and a control operand, the input data operand comprising one or more data elements, where each data element comprises a plurality of bits, and the control operand providing control information used to identify bit permutations required when performing a given bit permutation operation on each data element of the input data operand; arranging bit permute circuitry to treat the input data operand as a plurality of data portions of a fixed size, each data element comprising one or more of the data portions, and the number of data portions forming each data element being dependent on a size of the data elements in the input data operand; performing, using the bit permute circuitry, at least one bit permutation operation on each data portion of the input data operand, using the control information provided by the control operand for that data portion, in order to generate, for each data portion, at least one intermediate result; performing a result generation operation to generate, from the intermediate results output by the bit permute circuitry, a final result operand comprising one or more result elements, where each result element provides the result of performing the given bit permutation operation on the corresponding data element of the input data operand; employing a multi-level network of shifter circuits during the result generation operation, where the shifter circuits at a first level of the network perform shift operations using as inputs at least a subset of the intermediate results, and the shifter circuits at each subsequent level of the network perform shift operations using inputs derived from the outputs of the shifter circuits at the preceding level of the network; and analysing the control information provided by the control operand in order to generate control signals used to control the shift operations performed by the shifter circuits.

In a still further example arrangement, there is provided an apparatus comprising: interface means for receiving an input data operand and a control operand, the input data operand comprising one or more data elements, where each data element comprises a plurality of bits, and the control operand providing control information used to identify bit permutations required when performing a given bit permutation operation on each data element of the input data operand; bit permute means for treating the input data operand as a plurality of data portions of a fixed size, each data element comprising one or more of the data portions, and the number of data portions forming each data element being dependent on a size of the data elements in the input data operand, wherein the bit permute means is for performing at least one bit permutation operation on each data portion of the input data operand, using the control information provided by the control operand for that data portion, in order to generate, for each data portion, at least one intermediate result; and result generation means for generating, from the intermediate results output by the bit permute means, a final result operand comprising one or more result elements, where each result element provides the result of performing the given bit permutation operation on the corresponding data element of the input data operand; wherein the result generation means comprises a multi-level network of shifter circuit means, where the shifter circuit means at a first level of the network perform shift operations using as inputs at least a subset of the intermediate results, and the shifter circuit means at each subsequent level of the network perform shift operations using inputs derived from the outputs of the shifter circuit means at the preceding level of the network; and the apparatus further comprises control means for analysing the control information provided by the control operand in order to generate control signals used to control the shift operations performed by the shifter circuit means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
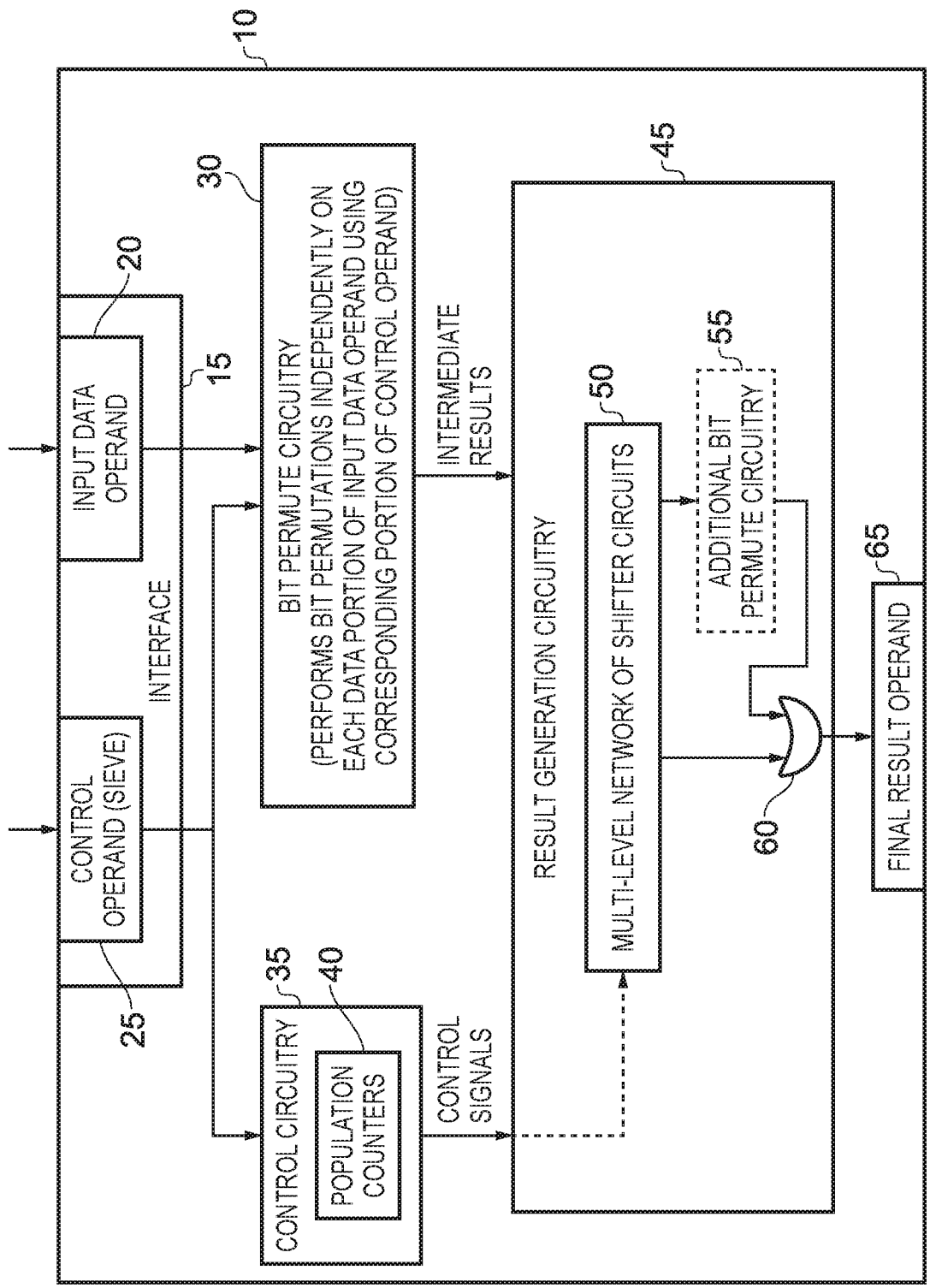
FIG. 1 is a block diagram of an apparatus in accordance with one example arrangement.

In accordance with the techniques described herein an apparatus (also referred to herein as a bit permute unit) is provided that has an interface for receiving an input data operand and a control operand. The input data operand comprises one or more data elements, where each data element comprises a plurality of bits. The control operand then provides control information used to identify bit permutations required when performing a given bit permutation operation on each data element of the input data operand. Various different sizes of data element may be supported by the apparatus. Hence, by way of example, in some instances the input data operand may merely comprise a single data element, but in other instances the input data operand may comprise two data elements each of half the size of the input data operand, four data elements each of a quarter of the size of the input data operand, etc. The apparatus needs to be able to deal with these different sizes of data elements, since the given bit permutation operation needs to be performed on each data element in the input data operand.

In accordance with the techniques described herein, the apparatus has bit permute circuitry that is arranged to treat the input data operand as a plurality of data portions of a fixed size, where each data element comprises one or more of the data portions, and the number of data portions forming each data element is dependent on a size of the data elements in the input data operand. Hence, irrespective of the data element size applicable when the apparatus is used to perform the given bit permutation operation on each data element, the bit permute circuitry treats the input data operand as comprising a plurality of data portions of a fixed size, and hence the operations performed by the bit permute circuitry are not influenced by the data element size. The bit permute circuitry can hence operate using the input data operand and the control operand before any analysis is performed based on the actual size of the data elements within the input data operand.

In particular, the bit permute circuitry can be arranged to perform at least one bit permutation operation on each data portion of the input data operand, using the control information provided by the control operand for that data portion, in order to generate, for each data portion, at least one intermediate result.

In addition, the apparatus provides result generation circuitry to generate, from the intermediate results output by the bit permute circuitry, a final result operand comprising one or more result elements, where each result element provides the result of performing the given bit permutation operation on the corresponding data element of the input data operand. Hence, whilst the intermediate results produced by the bit permute circuitry are independent of the actual data element size, the result generation circuitry can then utilise those intermediate results in order to produce result elements for the individual data elements, taking into account the data element size.

In accordance with the techniques described herein, the result generation circuitry comprises a multi-level network of shifter circuits, where the shifter circuits at a first level of the network perform shift operations using as inputs at least a subset of the intermediate results, and the shifter circuits at each subsequent level of the network perform shift operations using inputs derived from the outputs of the shifter circuits at the preceding level of the network. Further, the apparatus comprises control circuitry that analyses the control information provided by the control operand in order to generate control signals used to control the shift operations performed by the shifter circuits.

It has been found that such an approach enables a significant reduction in the area requirements of the apparatus forming a bit permute unit. In particular, it has been found that by producing the intermediate results for fixed size data portions, the multi-level network of shifter circuits can then be arranged to provide a very area efficient mechanism for constructing the final result elements for each data element, with a relatively low logic depth. It has also been found that the control circuitry required to generate the necessary control signals for the network of shifter circuits can be implemented with low complexity, and hence can operate quickly with low area overhead. The solution hence provides a particularly area efficient solution, but without significantly impacting latency, and is able to accommodate performance of bit permutation operations on a variety of different data element sizes.

The control circuitry can take a variety of forms, but in one example is arranged to produce at least one population count indication from the control information provided by the control operand for each data portion, and to use the population count indications to derive the control signals used to control the shift operations performed by the shifter circuits. It has been found that by generating such population count indications, all of the required control signals for the shifter circuits can be generated in order to enable final results to be constructed that take into account the actual size of the data elements within the input data operand. The control circuitry can hence be constructed in a simple and area efficient manner, for example using simple counter circuits to count the values of control bits within certain sized portions of the control operand.

In one example implementation the control operand comprises a bit vector providing a control bit for each bit in the input data operand, and the population count indications identify, for each data portion, at least one of the number of control bits set to 1 and the number of control bits set to 0 in a corresponding portion of the bit vector. In one example implementation the different portions of the bit vector can be analysed in parallel, hence enabling a number of different population counts to be generated in parallel, thereby increasing the speed of operation of the control circuitry.

In one example implementation, in addition to producing population count indications for each data portion sized block of the bit vector, the control circuitry may be further arranged to produce, for at least one data element size comprising multiple data portions, at least one population count indication for the control information provided by the control operand for each block of adjacent data portions having that data element size. Such additional population count indications are useful when handling the larger data element sizes that may be supported by the apparatus.

Since the control circuitry merely needs to generate a number of different population count indications, in order to provide sufficient information for the control signals to be generated to control the network of shifter circuits, the operations required by the control circuitry can be performed relatively quickly. In one example implementation, the control circuitry can operate in parallel with the bit permute circuitry, providing a particularly efficient implementation. In particular, as discussed earlier, since the bit permute circuitry operates on fixed size data portions, irrespective of the size of the data elements within the input data operand, the bit permute circuitry can operate without needing to await for any of the control signals to be generated by the control circuitry, and hence can operate entirely independently of the control circuitry in order to generate intermediate results that can then be further manipulated by the result generation circuitry in dependence on the control signals generated by the control circuitry. This can significantly increase the speed of operation of the apparatus, and thus reduce latency.

The bit permute circuitry can be arranged in a variety of ways, but in one example implementation comprises multiple bit permute blocks operating in parallel, where each bit permute block is arranged to perform the at least one bit permutation operation on an associated one of the data portions. By such an approach, each of the data portions within the input data operand can be processed in parallel by the bit permute circuitry, thereby increasing the speed at which the various intermediate results can be generated.

The shifter circuits within the multi-level network can be organised in a variety of ways, but in one example implementation the inputs to the shifter circuits at each subsequent level of the network are determined from the outputs of the shifter circuits at the preceding level of the network without any reordering of the bits of those outputs. Hence, the output bit pattern from one shifter level is not reordered prior to being used as an input within the next shifter level. It has been found that the network of shifter circuits can accordingly be arranged in a very area efficient manner, generally removing the need for multiplexer circuitry between the different levels of the shifter network. In particular, for the most part the shifter circuits in one level do not connect or feed into more than one shifter in the next or consuming shifter level, thus avoiding the need for multiplexing circuitry. Hence, the output from a shifter in one level of the network will typically only have one destination, consumer, or load in a subsequent level of the shifter network, hence eliminating fan-out delays that might otherwise be incurred, and thus significantly reducing latency.

The various shifter circuits within the network can be organised in a variety of ways, but in one example implementation the shifter circuits at each subsequent level of the network are associated with a larger data element size than the shifter circuits at a preceding level of the network. The control circuitry is then arranged to generate the control signals taking into account the size of the data elements in the input data operand.

The additional circuitry required between each level of the shifter network is typically relatively small, thereby producing significant area savings. For example, in one implementation, at each subsequent level of the network the input of each shifter circuit at that level is produced by an output of an OR circuit that receives as one of its inputs the output from one of the shifter circuits at the preceding level in the network.

In one example implementation, the intermediate results produced as outputs by the bit permute circuitry and/or the outputs of the shifter circuits have any inactive bits set to 0 to facilitate combining of multiple of the outputs using OR logic circuitry. Such a form of data may be referred to herein as an ordered byte data type, and such an approach can eliminate the need for extra control logic to calculate a mask to mask off unneeded data from the outputs. Instead, the outputs can be forwarded directly as inputs into OR logic circuitry without any masking operations required, thereby further enabling a significant reduction in area and complexity of the circuitry.

The control signals generated by the control circuitry can take a variety of forms. Those control signals may be used to determine the extent to which the input data provided to a shift circuit is shifted (some shift circuits may be performing left shifts whilst others may be performing right shifts). It should also be noted that the control circuitry is able to generate control signals that may identify to an individual shifter circuit that no shift operation is required in respect of its input.

The fixed size of data portion that is handled by the bit permute circuitry may vary dependent on implementation. However, in one example implementation the fixed size of each data portion is one byte. In one such example implementation, the supported data element sizes may then be a byte, a half word, a word, and in some implementations a double word. It will be appreciated that each of these data element sizes that are supported is a multiple of the data portion size.

The control operand can take a variety of forms, but in one example implementation comprises a bit vector providing a control bit for each bit in the input data operand.

The given bit permutation operation can also take a variety of forms, but in one example is a bit extract operation that comprises, for each data element, extracting from that data element the data bits whose associated control bit is set to a first value in the bit vector, and outputting the extracted data bits in order within a number of least significant bits of the result element. The first value of the control bit that is used when deciding which data elements to extract may be either a logic 0 value or a logic 1 value, but in one example implementation is a logic 1 value, and hence wherever a control bit is set to a logic 1 value, the corresponding data bit in the data element is extracted, and then those extracted data bits are output in order within a number of least significant bits of the result element. In one example implementation, the remaining bits of the result element (i.e. the more significant bits that have not been populated with one of the extracted data bits) may then be set equal to a logic 0 value.

In one example implementation, in order to support the above bit extract operation, the bit permute circuitry may be arranged to perform the bit extract operation on each data portion such that the extracted data bits appear in order within a number of least significant bits of the intermediate result generated for that data portion. The control circuitry is then arranged to control the shifter circuits so that each result element is generated from a number of the intermediate results, with that number being dependent on the data element size. When each data element is formed of multiple data portions the multi-level network of shifter circuits may be controlled by the control circuitry such that, for each data element, the extracted data bits from each of the multiple data portions forming that data element appear adjacent to each other within a number of least significant bits of the result element.

Hence, it can be seen that the multi-level network of shifter circuits is used to manipulate the intermediate results produced for each of the data portions forming each data element so as to construct a result element for each data element that has all of the extracted data bits appearing adjacent to each other within the least significant bits of the result element. A decision as to how much to shift the various intermediate results by can be determined from the earlier-mentioned population count indications produced by the control circuitry, indicative for example of the number of logic 1 values and/or number of logic 0 values appearing in the relevant portions of the control operand.

As another example of bit permutation operation that can be supported by the apparatus disclosed herein, the given bit permutation operation may be a bit group operation that comprises, for each data element, extracting from that data element the data bits whose associated control bit is set to a first value in the bit vector, outputting the extracted data bits in order within a number of least significant bits of the result element, further extracting from that data element the remaining data bits whose associated control bit is set to a second value in the bit vector, and outputting the remaining data bits in order within a number of most significant bits of the result element.

In order to support such a bit group operation being performed on each of the data elements, the bit permute circuitry may be arranged to perform a first bit permutation operation on each data portion in order to extract from that data portion the data bits whose associated control bit is set to a first value in the bit vector, and to output the extracted data bits in order within a number of least significant bits of a first intermediate result generated for that data portion. In addition the bit permute circuitry may perform a second bit permutation operation on each data portion in order to extract from that data portion the data bits whose associated control bit is set to a second value in the bit vector, and to output the extracted data bits in order within a number of most significant bits of a second intermediate result generated for that data portion. The control circuitry is then arranged to control the shifter circuits so that each result element is generated from a number of the intermediate results, with that number being dependent on the data element size. When each data element is formed of multiple data portions the multi-level network of shifter circuits may be controlled by the control circuitry such that, for each data element, the extracted data bits from each of the multiple data portions forming that data element that were provided in the first intermediate results appear adjacent to each other within a number of least significant bits of the result element, and the extracted data bits from each of the multiple data portions forming that data element that were provided in the second intermediate results appear adjacent to each other within the remaining bits of the result element. Hence, in accordance with the above described technique, the bit permute circuitry generates two different intermediate results for each data portion and then the control circuitry can be used to combine a number of the first intermediate results and a number of the second intermediate results so as to generate the required result elements for each data element.

In order to support the different types of shift operation that will be required in respect of the first and second intermediate results, the multi-level network of shifter circuits in one example implementation comprises a first network of shifter circuits to operate on the first intermediate results by performing right shifts, and a second network of shifter circuits to operate on the second intermediate results by performing left shifts.

If desired, the apparatus can be extended so as to support one or more additional bit permutation operations that are unsupported by the earlier-mentioned bit permute circuitry. In particular, it has been found that such additional bit permutation operations can be supported in an efficient manner, by reusing the multi-level network of shifter circuits.

In one example implementation, the result generation circuitry further comprises additional bit permute circuitry to support an additional bit permutation operation unsupported by the bit permute circuitry, the additional bit permute circuitry comprising a plurality of additional bit permute blocks that each operate on an input data block having the fixed size of the data portions. When the apparatus is configured to perform the additional bit permutation operation, the bit permute circuitry may be arranged to selectively output each data portion either unchanged, or zeroed, as the intermediate result for that data portion. The control circuitry is then arranged to control the multi-level network of shifter circuits so as to generate from the input operand, taking into account the data element size, the input data block for each additional bit permute block.

Hence, in this example implementation the multi-level network of shifter circuits is reused so as to generate the required input data blocks for each additional bit permute block. The original bit permute circuitry is, in such instances, controlled so that it merely outputs its input data portion unchanged as the intermediate result, or in some instances creates an all zeros intermediate result, and the control circuitry then produces suitable control signals to ensure that the network of shifter circuits generates from those intermediate results the required input data for each additional bit permute block.

In one example implementation, each additional bit permute block is associated with one data portion of the input data operand and is arranged to receive the control information provided by a portion of the control operand corresponding to that data portion. Each additional bit permute block is then arranged to perform the additional bit permutation operation on its input data block, using the received control information.

Due to the way in which the network of shifter circuits is used to generate the required input data blocks for each additional bit permute block, then in one example implementation the final result operand generated for the additional bit permutation operation by the result generation circuitry can be obtained merely by concatenating together the outputs from each of the additional bit permute blocks, thereby significantly reducing complexity. In particular, it should be noted that nothing further is needed at this point to account for the data element size, as that was taken into account when deciding what data input to provide to each additional bit permute block.

The additional bit permutation operation may take a variety of forms, but in one example implementation is a bit deposit operation that comprises, for each data element, outputting in the corresponding result element, at each bit position whose associated control bit is set to a first value in the bit vector, a data bit from the data element, starting with a least significant bit of the data element, such that when there are N control bits set to a first value in the portion of the bit vector corresponding to the data element, the corresponding result element has the N least significant bits of the data element deposited in the bit positions of the result element identified by the N control bits set to the first value.

When supporting such a bit deposit operation, the control circuitry may be arranged to control the multi-level network of shifter circuits so as to generate, for each additional bit permute block, an input data block comprising a data portion sized group of bits selected from the input data operand. For each additional bit permute block, the first bit within the data portion sized group of bits provided as the input data block may be determined dependent on the number of control bits set to the first value in the lower significant portions of the control operand than the portion of the control operand received by that additional bit permute block. As with the earlier-discussed bit permutation operations, suitable control signals for the network of shifter circuits can be obtained from the population counts produced by the control circuitry, although as will discussed in more detail later with reference to a particular implementation example one or more additional counters may be provided within the control circuitry when supporting such a bit deposit operation in order to produce count values required solely in connection with performance of such a bit deposit operation.

Through using the techniques described above, it will be appreciated that the apparatus can perform a given bit permutation operation in parallel on a number of data elements, where the number of data elements that can be processed in parallel is dependent on the size of those data elements and the size of the input data operand. In situations where it is desired to process a vector of data elements larger than the size of the input data operand, then that vector of data elements can be broken down into multiple parts, where each part conforms to the size of the input data operand, and then the performance of the given bit permutation operation on that vector of data elements can be performed using multiple iterations through the above described apparatus, along with recirculation of the results from the preceding iteration. Hence, this provides additional flexibility to support larger vectors, without needing to replicate the above described bit permute unit.

Particular examples will now be described with reference to the figures.

FIG. 1 is a block diagram of an apparatus in accordance with one example implementation. The apparatus 10 includes an interface 15 for receiving an input data operand 20 and a control operand 25 (also referred to herein as a sieve). The input data operand comprises one or more data elements, where each of the data elements comprises multiple bits, and the control operand then provides control information used to identify bit permutations required when performing a given bit permutation operation on each data element of the input data operand 20. In the examples discussed herein the control operand takes the form of a bit vector providing a bit of control information for each bit in the input data operand. In particular, the values of each of the bits of control information will be used to determine which of the bits within each data element are selected for subjecting to particular bit permutations defined by the given bit permutation operation.

The same apparatus 10 can be used for a variety of different sized data elements provided within the input data operand, and hence by way of example can perform the given bit permutation operation on each data element within the input data operand, irrespective of whether the number of data elements within the input data operand is one data element, two data elements, four data elements or eight data elements. It will be appreciated that the techniques described herein are not limited to those specific examples of number of data elements that may be provided within the input data operand, but those examples are merely given for illustration purposes.

It will be appreciated that how individual bits within the input data operand need to be moved in dependence on the bit vector forming the control operand will differ dependent on the size of the data elements, since the given bit permutation operation needs to be performed on each of the data elements. However, in accordance with the techniques described herein, bit permutations are performed initially on fixed size data portions, irrespective of the data element size, and then additional steps are applied thereafter in order to construct the required results taking into account the size of the data elements. In particular, bit permute circuitry 30 is arranged to receive each of the fixed size data portions within the input data operand 20, and then to perform at least one bit permutation operation on each received data portion, using the corresponding portion of the bit vector forming the control operand 25.

The fixed size of the data portion may be varied dependent on implementation, but for the purposes of the examples described herein it will be assumed that the fixed size data portion is one byte. Hence, by way of example, if the input data operand is 64 bits in size, there will be eight fixed size data portions within the input data operand, irrespective of the number of data elements within the 64-bit input data operand, and accordingly the bit permute circuitry 30 will perform bit permutation operations on each of those eight fixed size data portions. As a result of the bit permutations performed by the bit permute circuitry 30, a plurality of intermediate results will be produced. In particular, there will be at least one intermediate result produced for each input data portion, but in some instances there may be more than one intermediate result produced for each input data portion, due to more than one bit permutation operation being performed in respect of each input data portion. More details of the forms of bit permutations that may be performed by the bit permute circuitry 30 will be discussed in more detail later.

Whilst the bit permute circuitry may be arranged to operate sequentially on each of the data portions, in one example implementation the bit permute circuitry 30 comprises a plurality of bit permute blocks that can operate in parallel, with each bit permute block being arranged to receive one of the data portions.

Whilst the bit permute circuitry 30 is performing the various bit permutations on the input data portions, the control circuitry 35 is arranged to receive the control operand 25 and to perform some analysis of the control operand that can then be used to generate control signals for subsequent circuitry within the apparatus 10. In the examples described herein, the control circuitry 35 is relatively simple, and indeed as will be discussed later may essentially consist of a series of population counters 40 for counting the values of the control bits within various sized portions of the control operand. This may include creating population count values for byte sized portions of the control operand (i.e. for the fixed size of the data portions), but may also involve determining population counts for larger sized blocks of the control operand, for example half word sized portions and full word sized portions.

As shown in FIG. 1, the apparatus 10 also includes result generation circuitry 45 that is arranged to generate, from the intermediate results output by the bit permute circuitry 30, a final result operand 65 comprising one or more result elements, where each result element provides the result of performing the given bit permutation operation on the corresponding data element of the input data operand. Hence, if the input data operand consisted of two 32-bit data elements, the final result operand would consist of two 32-bit result elements, if the input data operand consisted of four 16-bit data elements, then the final result operand will consist for four 16-bit result elements, etc.

By fixing the size of the blocks handled by the bit permute circuitry 30 irrespective of the data element size, it has been found that the required result operands can be generated essentially by performing shift operations on some of the intermediate results, and performing logical combinations using the shifted versions of the intermediate results (some of these logical combinations may also use at least one unshifted intermediate result). The direction in which the various intermediate results needs to be shifted, and the amount by which they need to be shifted, will depend on the size of the data elements within the input data operand and the form of the control bits provided within the control operand 25. The shifting to be performed will also be dependent on the type of bit permutation operation that is seeking to be performed on the data elements of the input data operand.

Based on the population count values produced by the population counters 40, the control circuitry 35 has all of the information it requires about the form of the control bits within the control operand, and can use this information, in combination with knowledge of the data element size and the type of bit permutation operation to be performed, to generate suitable control signals to handle the shifting operations required to be performed in the result generation circuitry 45. In particular, the result generation circuitry 45 may be arranged to include a multi-level network of shifter circuits 50, and each of the shifter circuits can be controlled by the control signals output by the control circuitry 35.

As shown in FIG. 1, since the bit permute circuitry 30 is operating on fixed size data portions, irrespective of the data element size, the bit permute circuitry 30 does not need any control information from the control circuitry 35, and accordingly the control circuitry 35 can operate in parallel with the bit permute circuitry, with the intermediate results generated by the bit permute circuitry then being forwarded to the result generation circuitry 45 along with the control signals generated by the control circuitry 35. This approach leads to a particularly efficient design, yielding an apparatus 10 that can operate relatively quickly, with low latency.

The multi-level network of shifter circuits 50 can be arranged in a variety of ways, but in one example implementation the shifter circuits at a first level of the network perform shift operations using as inputs at least a subset of the intermediate results, and the shifter circuits at each subsequent level of the network perform shift operations using inputs derived from the outputs of the shifter circuits at the preceding level of the network. Some of the data processed within the network of shifter circuits may in some instances bypass one of the levels within the shifter network and be forwarded on to a further level that acts as the consumer level of the shifter network for that data. It has been found that the network of shifter circuits can be arranged in a very area efficient manner, since there is generally no need for multiplexer circuitry between the different levels of the shifter network, and instead the shifter circuits in one level typically do not connect or feed into more than one shifter in the next or consuming shifter level. This eliminates fan-out delays that might otherwise be incurred, thus further significantly reducing the latency.

The output from the final level of the network of shifter circuits typically forms the final result operand 65, and is merely output for storage in a storage element used to store that final result operand 65. However, as shown in FIG. 1, there may be final selection circuitry 60 provided within the result generation circuitry 45, in situations where the optional additional bit permute circuitry 55 is provided, in order to select between the output from a final level of the shifter network and an output from the additional bit permute circuitry. Whilst in FIG. 1 the additional bit permute circuitry 55 is shown as receiving the output from the network of shifter circuits 50, as will be discussed later with reference to FIGS. 7D and 7E the additional bit permute circuitry 55 in one example implementation can be provided in parallel with the final level of the shift network, thereby further reducing the logic depth of the apparatus.

The selection circuitry can take a variety of forms, but as will be discussed in more detail later with reference to FIGS. 7D and 7E can effectively be implemented by OR gate circuitry given a gating function that can be applied to the output from the final level of the shifter circuits and from the output of the additional bit permute circuitry 55 dependent on the type of bit permutation operation being performed.

The additional bit permute circuitry 55 can be added to support one or more additional bit permutation operations that are not supported by the earlier-mentioned operations performed by the bit permute circuitry 30. In particular, it has been found that such additional bit permutation operations can be supported in an efficient manner, by reusing the multi-level network of shifter circuits 50. In one example implementation the additional bit permute circuitry 55 comprises a plurality of additional bit permute blocks that each operate on an input data block having the fixed size of the data portions. The network of shifter circuits 50 is used to construct the form of the input data block received by each of those additional bit permute blocks. When the apparatus 10 is performing the additional bit permutation operation supported by the additional bit permute circuitry 55, the bit permute circuitry 30 is arranged to merely pass its input data portions through unamended to form the intermediate results, so that the multi-level network of shifter circuits 55 then effectively operates on the original, unaltered input data operand. That shifter network performs suitable shift operations in order to then construct each of the individual data blocks required by each of the individual additional bit permute blocks within the additional bit permute circuitry 55, in such a way that each additional bit permute block can then operate on a data portion sized block of data produced by the network of shifter circuits 50. Further, each additional bit permute block is associated with one data portion of the input data operand and is arranged to receive the corresponding portion of the control operand as its control input.

Due to the way in which the network of shifter circuits 50 is used to generate the required input data blocks for each additional bit permute block, then in one example implementation the final result operand generated for the additional bit permutation operation can be obtained merely by concatenating together the outputs from each of the additional bit permute blocks, thereby significantly reducing complexity. In particular, the additional bit permute circuitry 55 does not need to account for the data element size, as that was taken into account when using the shifter circuits to produce the individual input data blocks provided to each additional bit permute block.

Figure 2:
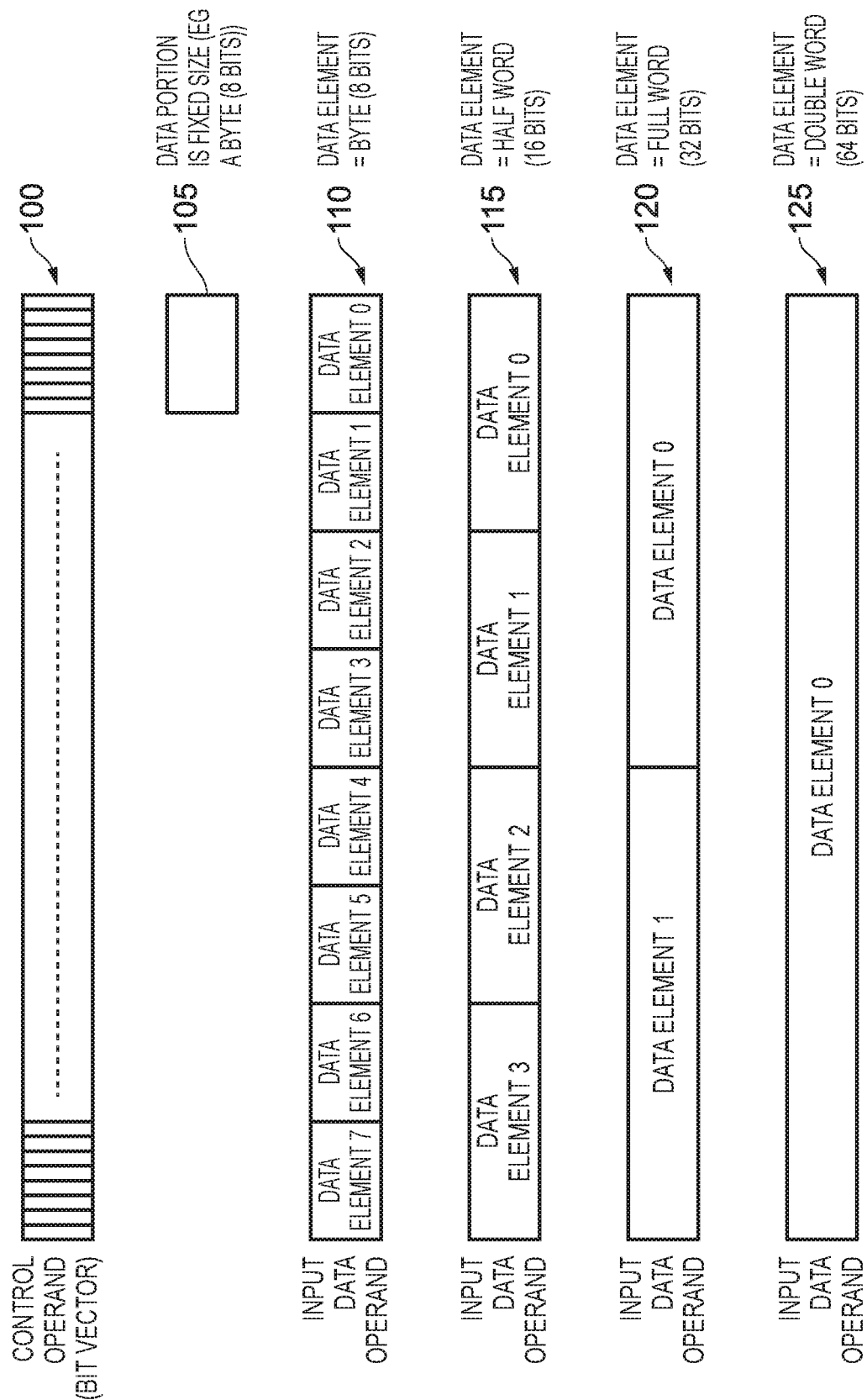
FIG. 2 schematically illustrates formats of control operand and input data operand that may be used in one example implementation.

FIG. 2 is a diagram illustrating the form of the control operand and various different forms of input data operand that may be supported by the apparatus 10. As discussed earlier, the control operand 100 typically take the form of a bit vector, providing one control bit for each bit in the input data operand. Hence, if the input data operand is 64 bits in length, then there will be 64 control bits in the bit vector forming the control operand 100.

As discussed earlier, the bit permute circuitry 30 is arranged to perform bit permutations independently on each fixed size data portion within the input data operand, this fixed size data portion being shown by the block 105 for one example implementation where the fixed size is a byte. Hence, in the example where the input data operand 20 is 64 bits in length, there will be eight data portions 105 that will be processed by the bit permute circuitry 30.

However, as shown in FIG. 2 the actual data element size may vary, and the apparatus 10 can support performing bit permutation operations on each of those different data element sizes. Hence, whilst in one instance the input data operand 110 may comprise eight data elements (where in this case the data element size and the fixed data portion size 105 are the same), in another instance the input data operand 115 may comprise four data elements, each data element being 16 bits in size (i.e. a half word). As another example, the input data operand 120 may include two data elements, each of 32 bits in size (i.e. a full word), or indeed the input data operand 125 may comprise a single data element of 64 bits in length (i.e. a double word).

In situations where it is desired to perform bit permutations on a larger vector of data elements than supported by the input data operand size, for example a 128-bit vector of data elements where the input data operand size is 64 bits, then this can be supported by splitting the bit permutation operation into two micro-operations, and reusing the apparatus 10 (also referred to herein as the bit permute unit) over multiple iterations. A forwarding network can be provided around the apparatus 10 to enable information from performance of the first micro-operation to be routed back as an input for use when performing the second micro-operation. In one example implementation, the forwarding network may support the forwarding of the result in the lower 64 bits of a 128-bit vector to the high 64 bits of an input vector. In such situations, during the first iteration through the apparatus, the high 64 bits could be processed, i.e. using the high 64 bits of the 128-bit data operand vector, and the high 64 bits of the corresponding control operand. The results would be placed within the lower 64 bits of an output, but the forwarding network can then be used during the performance of the second micro-operation (which operates on the low 64 bits of the input data operand and the control operand) to move the answer from the first micro-operation to the high order 64 bits, thus avoiding the need for an additional micro-operation to be performed merely to merge the results from the two preceding micro-operations. By such an approach, it is possible to avoid replicating the apparatus 10 in order to support larger vectors of data elements.

Figure 3A:
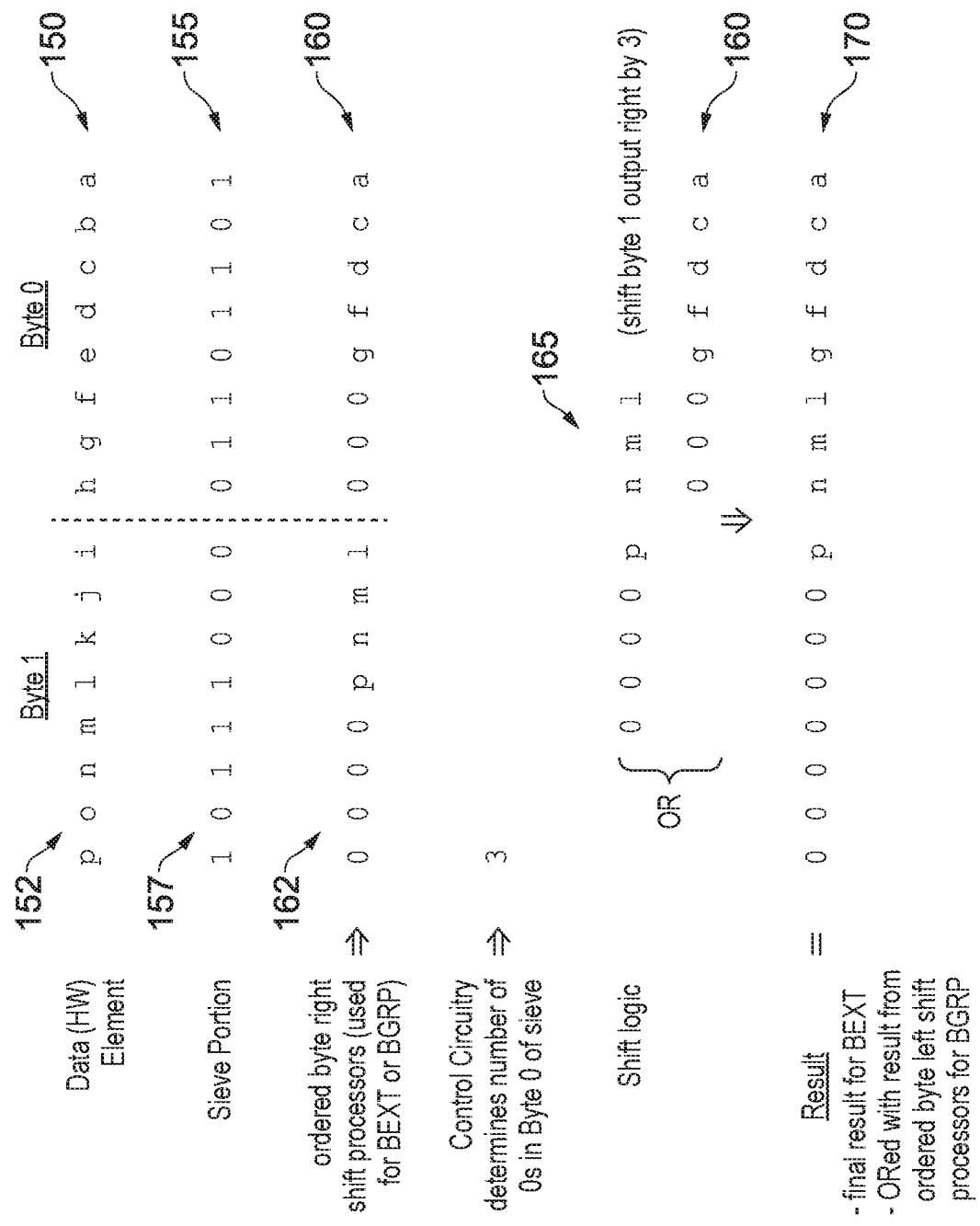
FIG. 3A illustrates one bit permutation operation that may be supported by the apparatus in one example implementation.

The given bit permutation operation that it is desired to perform using the apparatus 10 can take a variety of forms, and indeed the apparatus 10 in one example implementation can support the performance of multiple different types of bit permutation operation. One type of bit permutation operation that can be supported is a bit extract (BEXT) operation that involves, for each data element, extracting from that data element the data bits whose associated control bit is set to a first value (typically a logic 1 value) in the bit vector, and then outputting the extracted data bits in order within a number of least significant bits of the result element. This operation is illustrated schematically in FIG. 3A. In this example, it is assumed that the data element size is a half word, and hence a data element consists of the two bytes 150, 152. The corresponding two portions of the sieve are shown in FIG. 3A as the example values 155, 157. As discussed earlier with reference to FIG. 1, the bit permute circuitry 30 operates independently on each fixed size data portion, and in this example it is assumed that the fixed size data portion is a byte. Hence, the bit permute circuitry 30 (more particularly ordered byte right shift processors provided therein) performs the earlier-mentioned BEXT operation independently on each of the byte sized portions, resulting in the intermediate results 160, 162.

It is then necessary to use the network of shifter circuits 50 to construct the result element that is needed taking into account the data element size. In this example, the population counters 40 within the control circuitry 35 are used to determine the number of logic 0 values in byte 0 of the sieve, which in this example yields the result of 3 given the form of the byte sized sieve portion 155. The shift logic within the shifter network 50 is then used to right shift the intermediate result 162 by 3 to produce the right shifted value 165. This value is then logically combined with the intermediate result 160. In the examples discussed herein, the intermediate results are generated as ordered bytes, where the empty positions are filled with logic 0 values. As a result, this significantly reduces the complexity of performing the required combinations, since as shown in FIG. 3A it is possible to combine the two data values 160, 165 using a simple logical OR operation in order to produce the result 170. Again, the result is arranged in ordered byte format, with any unused bits being set to a logic 0 value. It can be seen that the result element 170 correctly represents the result of performing the earlier-mentioned BEXT operation on the half word sized input data element formed of the two bytes 150, 152.

Figure 3B:
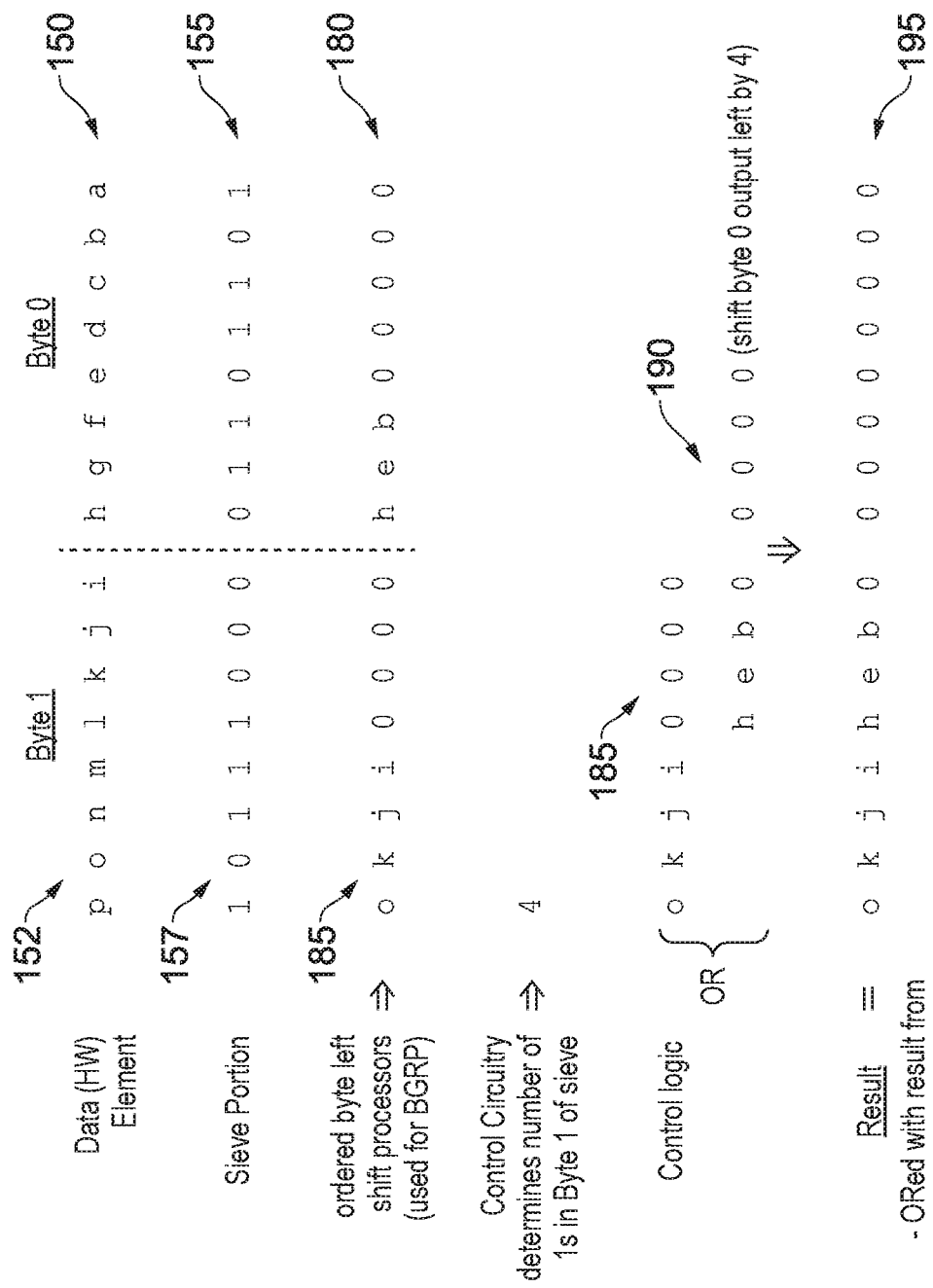
FIG. 3B illustrates another bit permutation operation that may be supported by the apparatus in one example implementation.

Another form of bit permutation operation that can be supported using the apparatus of FIG. 10 is a bit group (BGRP) operation that comprises, for each data element, extracting from that data element the data bits whose associated control bit is set to a first value (e.g. a logic 1 value) in the bit vector, and outputting those extracted data bits in order within a number of least significant bits of the result element, i.e. exactly as described earlier for the BEXT operation. However, in addition the BGRP operation involves further extracting from the data element the remaining data bits whose associated control bit is set to a second value (e.g. a logic 0 value) in the bit vector, and outputting those remaining data bits in order within a number of most significant bits of the result element. Hence, when performing such a BGRP operation, the bit permute circuitry 30 can be arranged to perform the operation discussed earlier with reference to FIG. 3A but also performs a further bit permutation operation as shown in FIG. 3B. In particular, for the second bit permutation operation, the input data portions and corresponding sieve portions are the same as in FIG. 3A, i.e. the two data portions 150, 152 and the two sieve portions 155, 157. However, the bit permute circuitry (more particularly ordered byte left shift processors provided therein) is now used to extract from each data portion the data bits whose corresponding control bits are at a logic 0 value, and to then output those bits and the number of most significant bit positions of the intermediate results 180, 185, with the remaining bits being set equal to 0.

The control circuitry then determines the number of 1s in byte 1 of the sieve, which in this instance gives an answer of 4 given the form of the sieve byte 157. In this case the control circuitry causes the shifter network to perform a left shift by 4 of the intermediate result 180, in order to produce the shifted intermediate result 190, which is then logically combined with the intermediate result 185 for byte 1. Again, since ordered byte format is used, this involves merely the performance of a logical OR operation resulting in the generation of the result 195. It will then be appreciated that the actual result required for the half word sized data element formed by the two byte portions 150, 152, when performing the BGRP operation, can be formed by merely ORing the result 195 of FIG. 3B with the result 170 of FIG. 3A. In particular, that final result element has all of the data bits whose corresponding control bits were 1 extracted and located in order in the least significant bits, and all of the data bits whose corresponding control bits were 0 extracted and placed in order in the most significant bits of the result.

The bit permute circuitry 30 may be arranged in a variety of ways, but as will be discussed by way of specific example with reference to FIGS. 7A to 7E, the bit permute circuitry may comprise a plurality of ordered byte right shift processors to perform the operations shown in FIG. 3A to generate first intermediate results 160, 162, and a plurality of ordered byte left shift processors to perform the operations shown in FIG. 3B, in order to produce a series of second intermediate results 180, 185. Further, the shifter circuits 50 can be arranged in a variety of ways, but in one example comprise a first network of shifters to operate on the first intermediate results by performing right shifts, hence implementing for example the functionality shown in the lower half of FIG. 3A, and a second network of shifters to operate on the second intermediate results by performing left shifts, hence for example performing the functionality shown in the lower half of FIG. 3B.

Figure 3C:
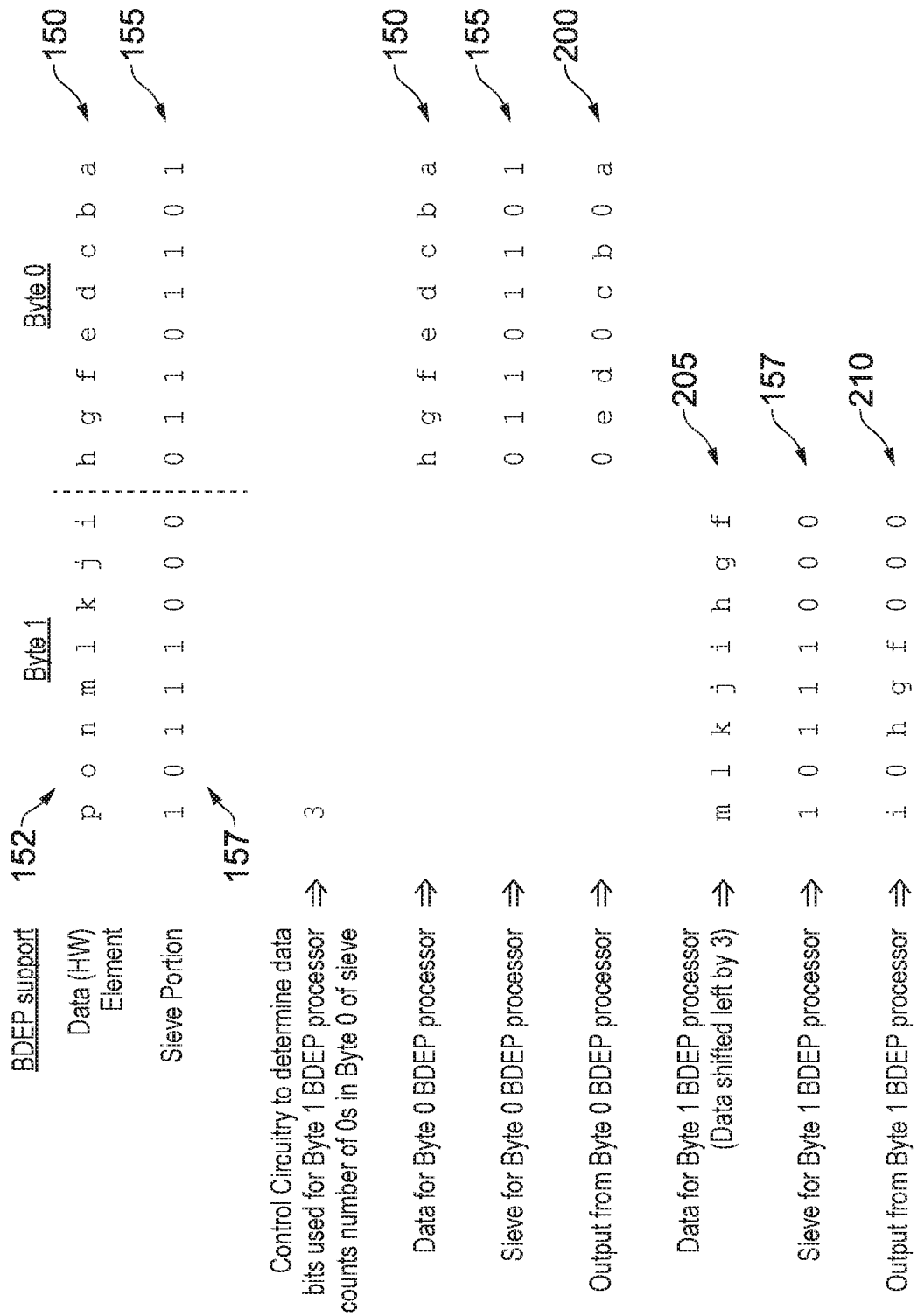
FIG. 3C illustrates a yet further bit permutation operation that may be supported by the apparatus in one example implementation.

As mentioned earlier, additional bit permute circuitry 55 can be used to support one or more additional bit permute operations that are not supported by the bit permute circuitry 30. One example of this is shown in FIG. 3C, where a bit deposit (BDEP) operation is shown. This comprises, for each data element, outputting in the corresponding result element, at each bit position whose associated control bit is set to a first value in the bit vector (i.e. a logic 1 value), a data bit from the data element, starting with the least significant bit of the data element. As a result, if for example there are N control bits set to 1 in the portion of the bit vector corresponding to the data element, the corresponding result element has the N least significant bits of the data element deposited in the bit positions of the result element identified by the N control bits set to 1. This functionality is illustrated by way of specific example with reference to FIG. 3C, where again the same data portions 150, 152 and sieve portions 155, 157 are considered as discussed earlier with reference to FIGS. 3A and 3B.

As mentioned earlier, when supporting such an operation, the bit permute circuitry 30 merely serves to route the input data portions through to its output as the intermediate results, and hence no manipulation is performed by the bit permute circuitry 30. The control circuitry 35 is used to determine the data bits that need to be input to each of the individual BDEP processors provided within the additional bit permute circuitry 55. In particular, as with the bit permute circuitry, the additional bit permute circuitry 55 can comprise multiple individual bit permute blocks, referred to herein as BDEP processors, where each of those operates on one byte of input data. However, the actual input data to each of those BDEP processors is created by the network of shifter circuits 50 based on the control signals produced by the control circuitry 35. For the example of byte 0, the byte 0 BDEP processor can operate on the data portion unchanged, and hence receives the data 150 along with the sieve 155. As a result of performing the earlier mentioned BDEP operation on that byte of data, this results in the generation of the result 200 shown in FIG. 3C. However, the input data for the byte 1 BDEP processor is not merely the input data 152, since account needs to be taken of the amount of data within byte 0 that has been consumed by the byte 0 BDEP processor. Accordingly, the control circuitry seeks to determine the data bits that will be used for the byte 1 BDEP processor by counting the number of logic 0 values in byte 0 of the sieve, in this case giving a result of 3 given the form of the sieve 155. This means that there are three unused data bits from byte 0 of the data 150, and accordingly a shift operation can be performed by the shift circuitry in order to generate the byte 1 BDEP processor data 205, by left shifting the data formed from the bytes 150, 152 by three bits.

It should be noted that the byte 1 BDEP processor still receives the original sieve portion 157, and then performance of the earlier-mentioned BDEP operation within the byte 1 BDEP processor results in the generation of the result 210. It should be noted that the elements 200, 210 can merely be concatenated together to produce the result for the half word sized data element formed from the portions 150, 152 without any further manipulation.

Figure 4:
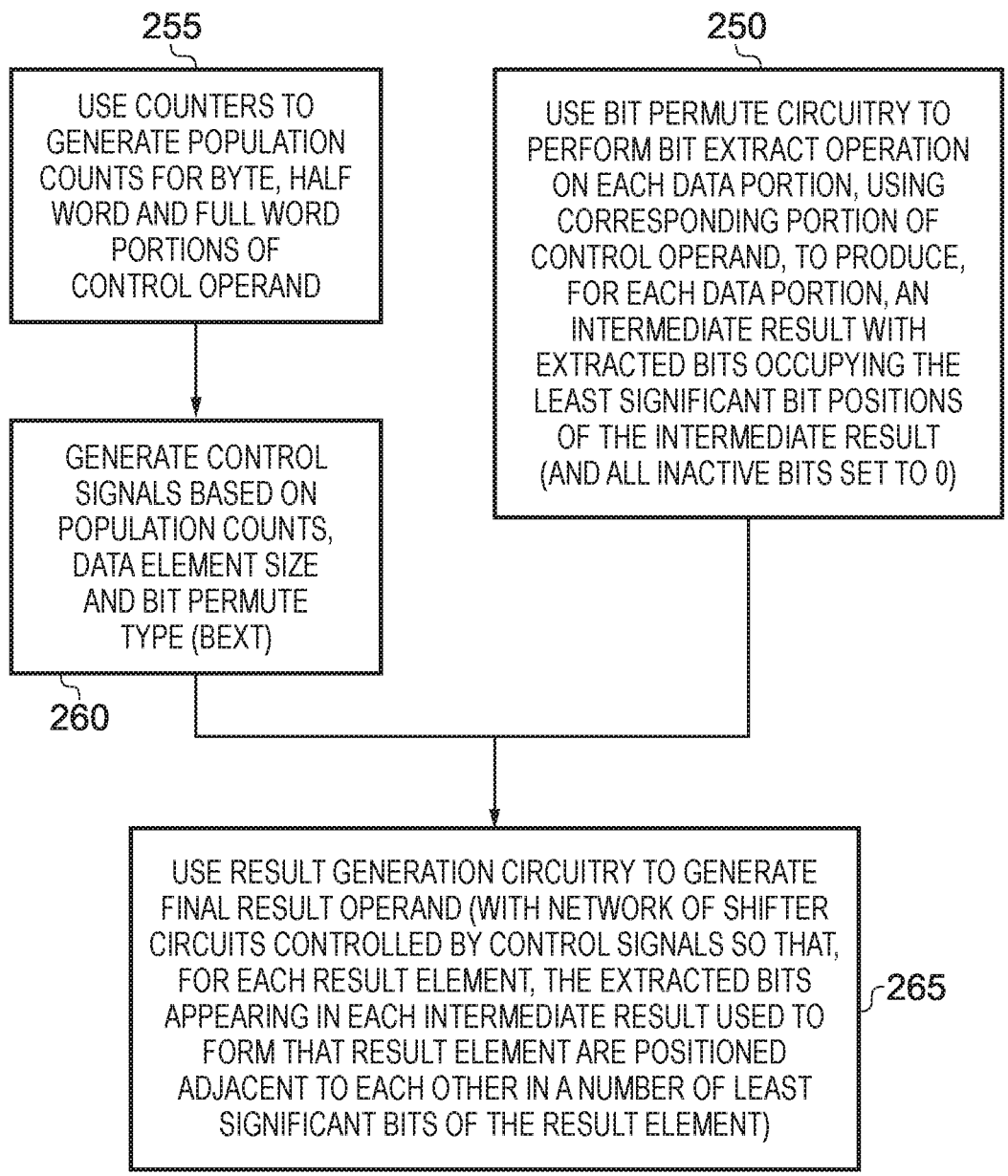
FIG. 4 is a flow diagram illustrating the performance of a bit extract operation using the apparatus of FIG. 1, in accordance with one example implementation.

FIG. 4 is a flow diagram illustrating performance of the earlier-mentioned BEXT bit permutation operation. At step 250, the bit permute circuitry 30 is used to perform a bit extract operation on each data portion, using a corresponding portion of the control operand. This produces, for each data portion, an intermediate result with the extracted bits being arranged in order so as to occupy the least significant bit positions of the intermediate result. As discussed earlier, in one example implementation all of the inactive bits (i.e. all of the remaining unused bits) are set to 0.

In parallel, at step 255 the population counters 40 within the control circuitry 35 are used to generate population counts for byte, half word and full word portions of the control operand. Then, at step 260 control signals are generated based on the population counts, the data element size and the bit permute type, in this example BEXT.

The process then proceeds to step 265 where the result generation circuitry is used to generate the final result operand. During this process, the network of shifter circuits are controlled by the control signals so that, for each result element, the extracted bits appearing in each intermediate result used to form that result element are positioned adjacent to each other in a number of least significant bits of the result element.

Figure 5:
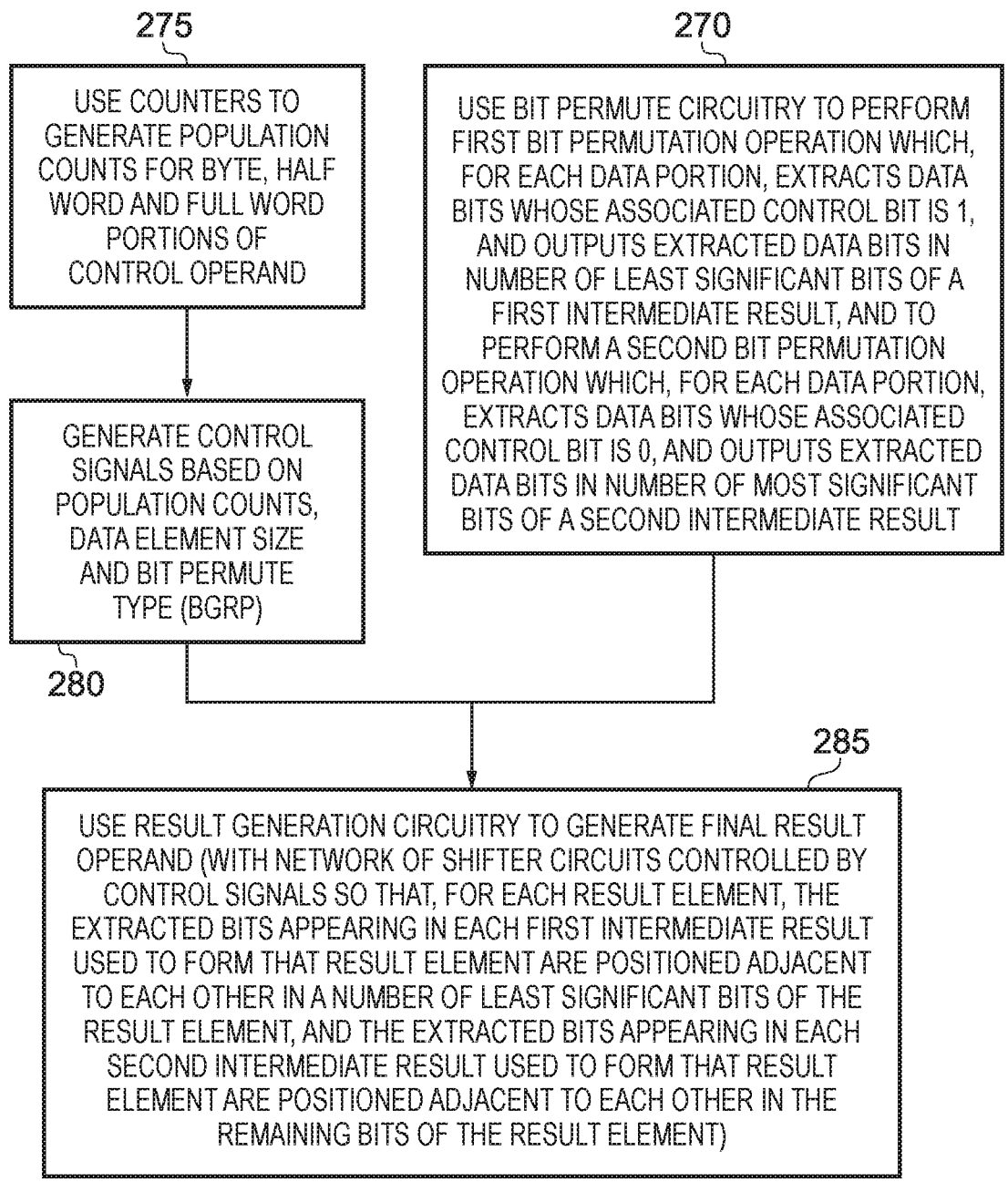
FIG. 5 is a flow diagram illustrating the performance of a bit group operation using the apparatus of FIG. 1, in accordance with one example implementation.

FIG. 5 is a flow diagram illustrating the performance of the earlier-mentioned BGRP operation using the apparatus 10 of FIG. 1. At step 270, the bit permute circuitry 30 is used to perform a first bit permutation operation which, for each data portion, extracts the data bits whose associated control bits is set to 1, and outputs the extracted data bits in order in a number of least significant bits of a first intermediate result. In addition, the bit permute circuitry performs a second bit permutation operation which, for each data portion, extracts the data bits whose associated control bit is 0, and outputs those extracted data bits in order in a number of most significant bits of a second intermediate result.

In parallel, the control circuitry performs the steps 275, 280, which correspond to the earlier described steps 255, 260 of FIG. 4. The process then proceeds to step 285, where the result generation circuitry is used to generate the final result operand. During this process, the network of shifter circuits are controlled by the control signals so that, for each result element, the extracted bits appearing in each first intermediate result used to form that result element are positioned adjacent to each other in a number of least significant bits of the result element, and similarly the extracted bits appearing in each second intermediate result used to form that result element are positioned adjacent to each other in the remaining bits of the result element.

Figure 6:
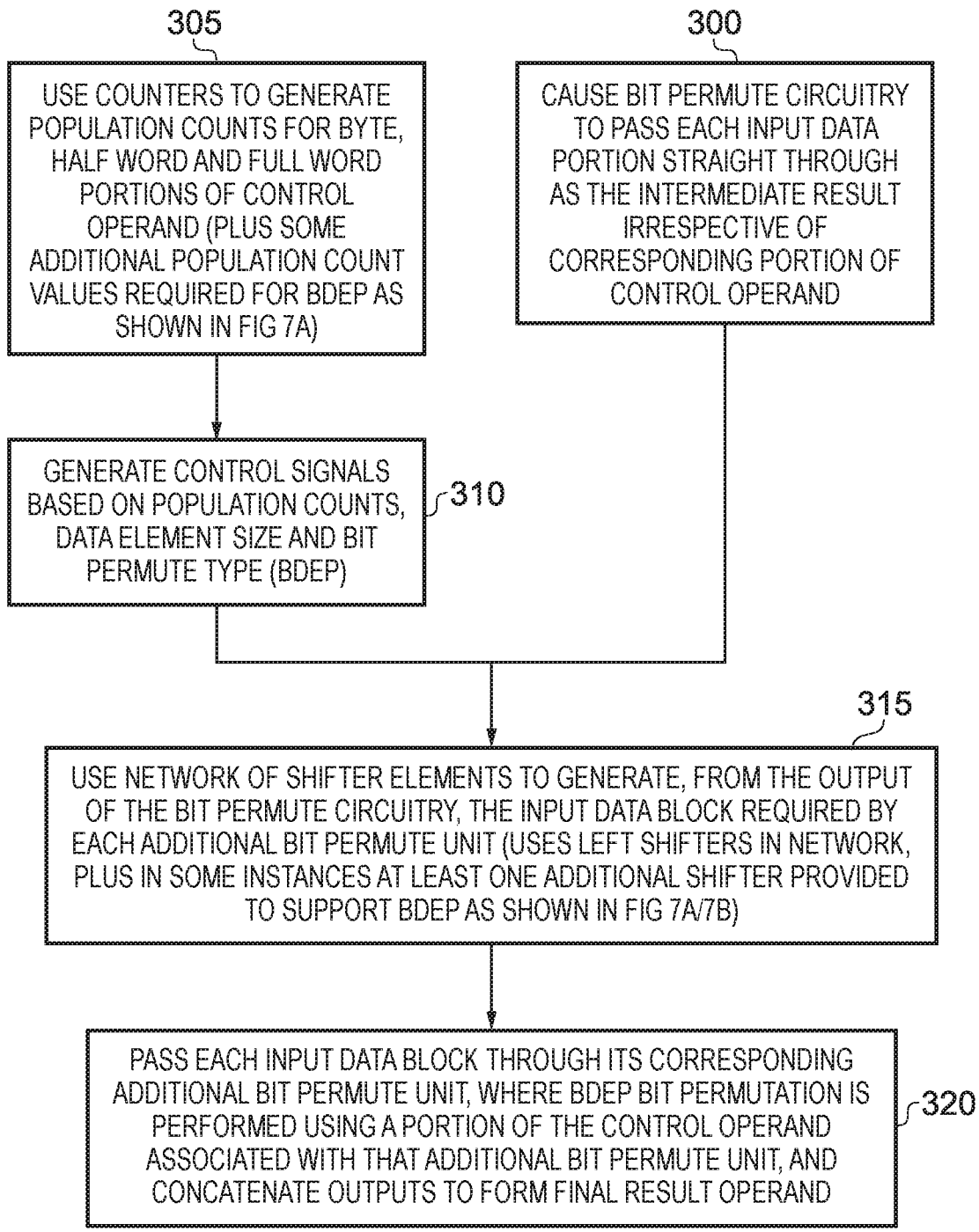
FIG. 6 is a flow diagram illustrating the performance of a bit deposit operation using the apparatus of FIG. 1, in accordance with one example implementation.

FIG. 6 is a flow diagram illustrating performance of the earlier-mentioned BDEP bit permutation using the apparatus 10 of FIG. 1. At step 300, the bit permute circuitry 300 is arranged to pass each input data portion straight through as the intermediate result irrespective of the corresponding portion of the control operand. In one example implementation discussed later with reference to FIGS. 7A to 7E, some of the shifters in the bit permute circuitry may in some instances output an all zero output as their part of the intermediate result, rather than outputting the input data portion unchanged. In parallel, at step 305, the control circuitry uses the counters to generate population counts for byte, half word and full word portions of the control operand. Further, as will be discussed later with reference to FIGS. 7A to 7C, in one example implementation some additional population count values may be generated that are used specifically for BDEP processing. At step 310, control signals are then generated based on the population counts, the data element size and the bit permute type, in this example BDEP.

The process then proceeds to step 315 where the network of shifter elements are used to generate, from the outputs of the bit permute circuitry, the input data block required by each additional bit permute block. In performing this functionality, the left shifters within the network are used, and in addition in some instances at least one additional shifter is provided within the shifter network to support the BDEP operation, as will be discussed later with reference to FIGS. 7A to 7E.

At step 320, each input data block as generated by the shifter network is passed through its corresponding additional bit permute block, where the BDEP bit permutation is performed using a portion of the control operand associated with that additional bit permute block. The outputs from the various BDEP bit processors are then concatenated in order to form the final result operand.

FIGS. 7A to 7E provide a detailed diagram of circuitry that can be used to implement the apparatus shown in FIG. 1, in accordance with one example implementation. The bit permute circuitry 30 of FIG. 1 is implemented by the series of ordered byte left shifter circuits 410 and ordered byte right shifter circuits 415. Each ordered byte right shifter circuit performs the bit extraction operation illustrated by way of example in the upper half of FIG. 3A for an associated byte of the input data operand, and outputs a first intermediate result. Similarly, each ordered byte left shifter circuit operates on an associated byte of the input data operand, to perform the bit permutation illustrated by way of example in the upper part of FIG. 3B, and to output a second intermediate result.

Figure 7A:
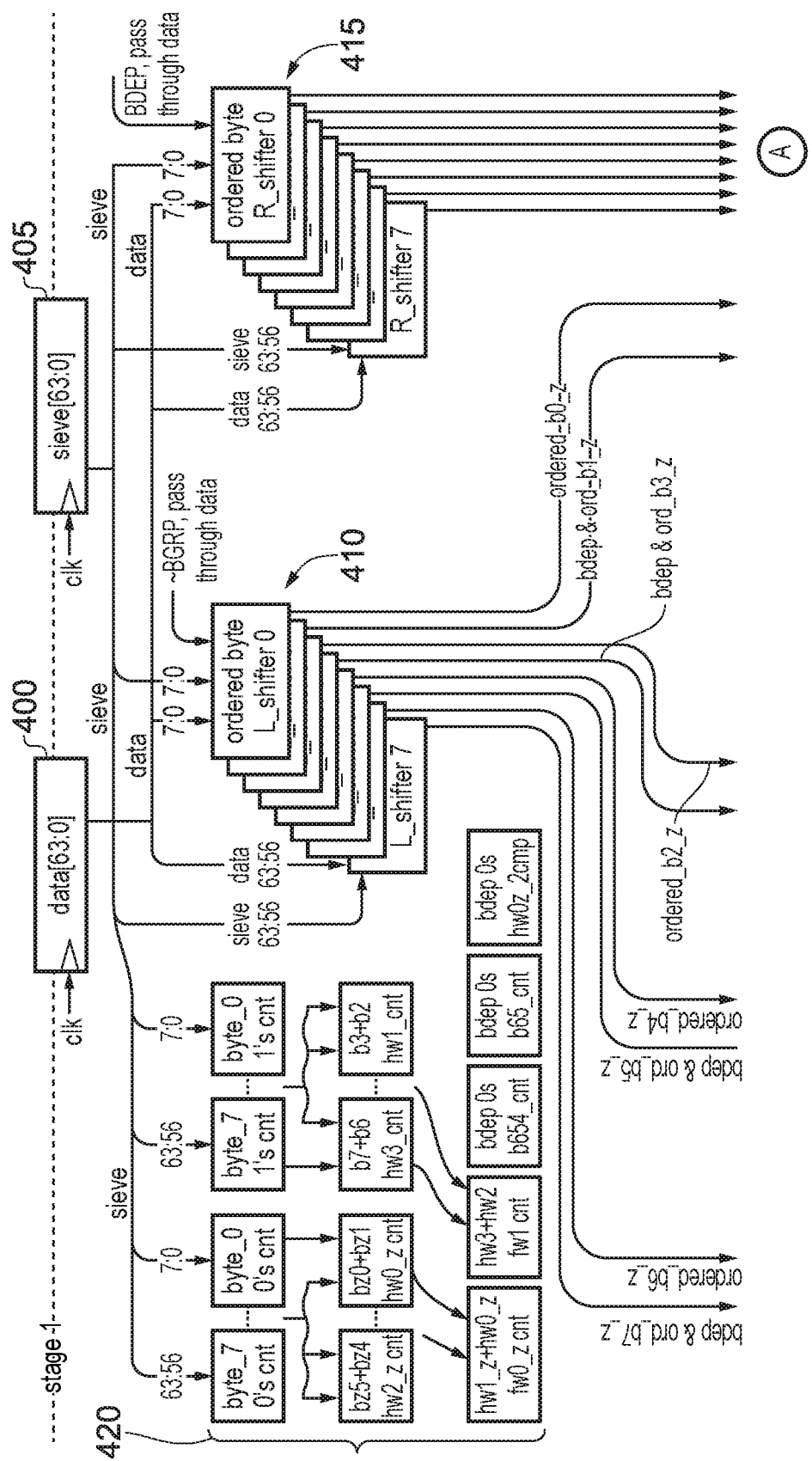
FIGS. 7A to 7E provide a detailed diagram of a bit permute unit of the form illustrated in FIG. 1, in accordance with one example implementation.
Figure 7A:
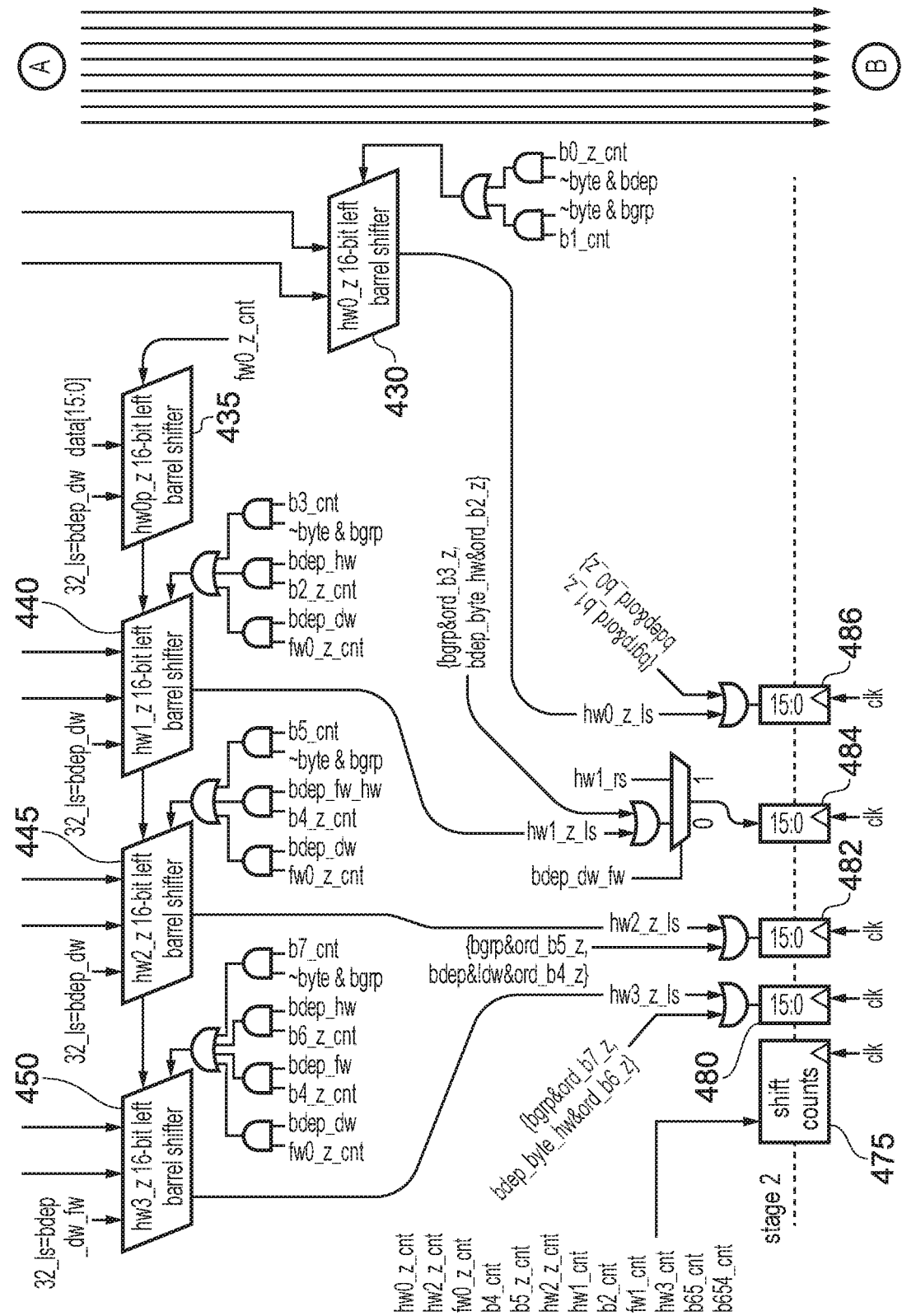
Figure 7A:
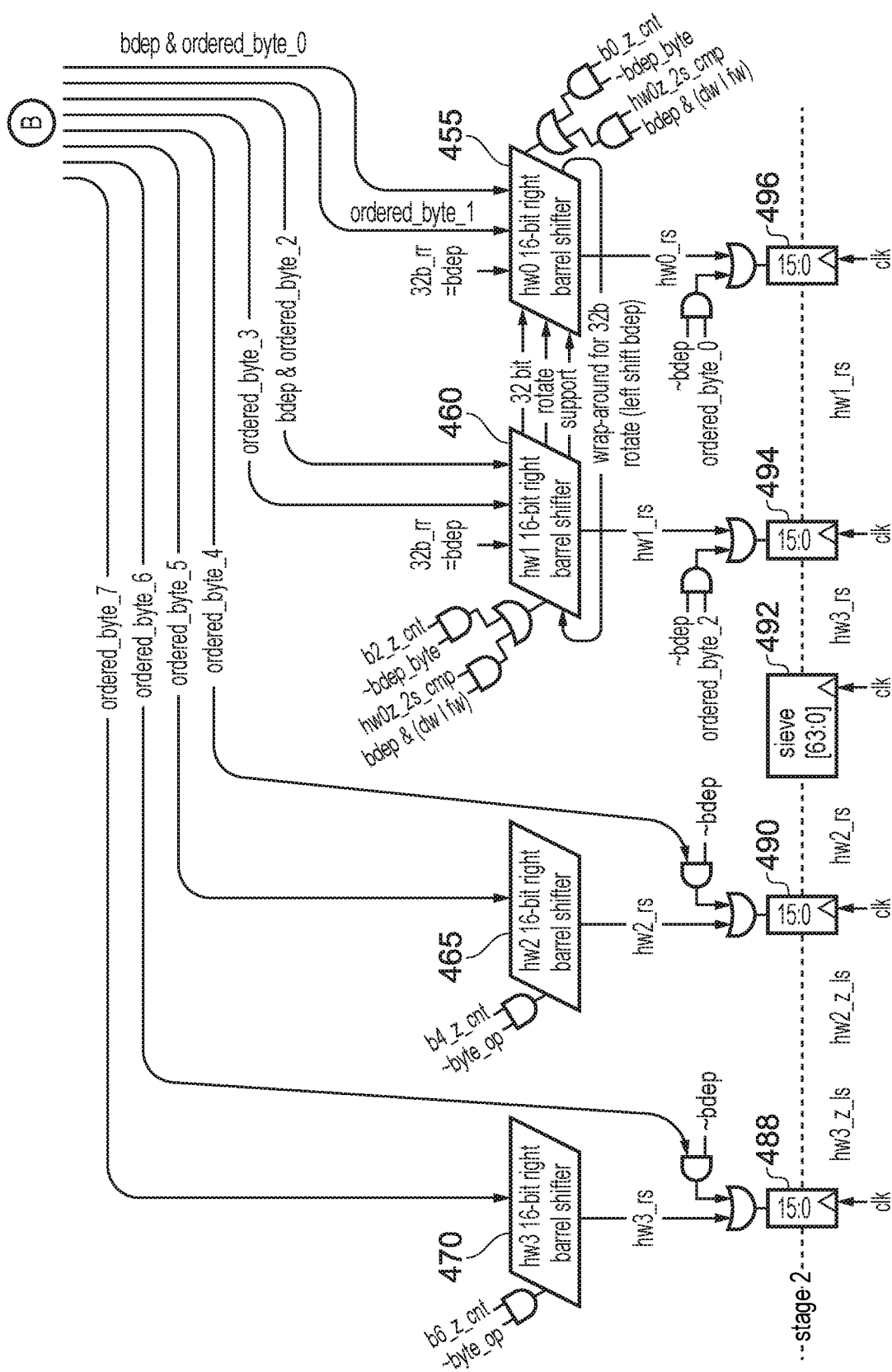

The control circuitry 35 of FIG. 1 includes a series of population counters 40, which are shown in more detail as the counter blocks 420 in FIG. 7A. A first level of population counters produce count indications of 1s and 0s appearing in each byte sized portion of the sieve 405. Additional levels of counters are provided as shown to provide counts of 0s and 1s in half words and full words. Three additional counters are also provided for producing count values used when performing the earlier-mentioned BDEP permutations.

Figure 7B:
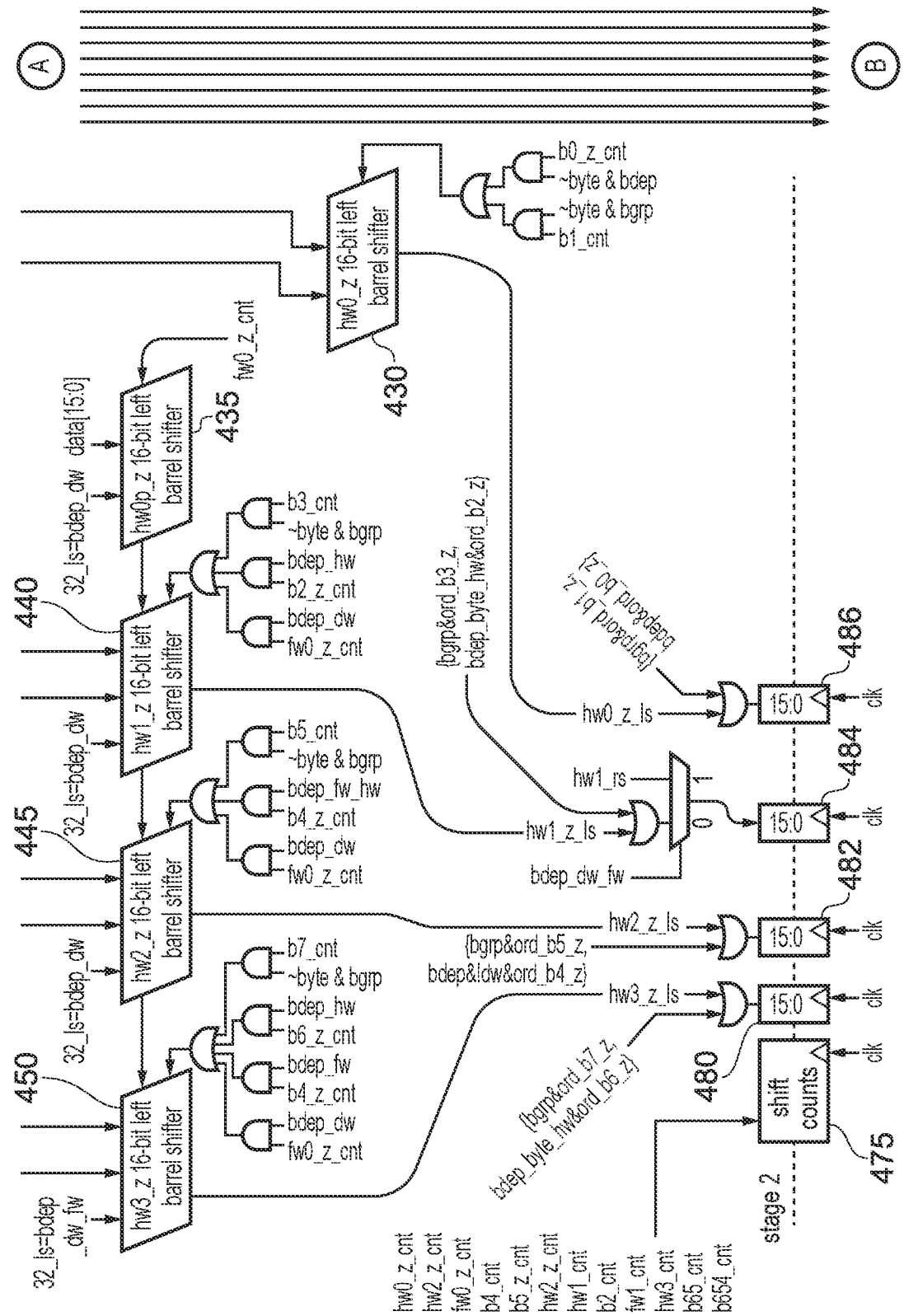

The shifter network 50 of FIG. 1 is implemented by a series of levels of left shifter and right shifter circuits as illustrated in FIGS. 7A to 7E. The second half of the first execute stage (the first execute stage being shown in FIGS. 7A to 7C) contains half word sized shifters. In particular, the left shifters 430, 435, 440, 445, 450 are provided, and the right shifters 455, 460, 465, 470 are also provided. As shown in FIG. 7B, the left shifters 430, 440, 445, 450 receive the second intermediate results from the even ordered byte left shifter circuits, since these are the subset of the second intermediate results that may need left shifting when performing BGRP operations. When performing BDEP operations these shifters also receive the second intermediate results from the odd ordered byte left shifter circuits. The left shifter circuit 435 is not used when performing BGRP operations, but is provided to support further left shifting that may be required when supporting BDEP operations. In particular, left shifter circuit 435 is used for dw bdep left shifting by up to 32 bits to make an intermediate answer that is further shifted for bdep processors 7-4 in stage 2. During this process, left shifter circuit 430 is used for shifting input data for bdep processors 0 and 1.

Considering the right shift circuits 455, 460, 465, 470, these receive the first intermediate results from the odd ordered byte right shifter circuits 415, since these are the subset of the first intermediate results that may need right shifting when performing BEXT or BGRP operations. The right shift circuits 455, 460, 465, 470 also receive the first intermediate results from the even ordered byte right shifters when performing BDEP operations on full word and double word sized data elements (the first intermediate results are zeroed for half word and byte sized elements). As shown, the two right shift circuits 455, 460 are coupled together to support wrap around functionality when performing 32 bit rotate operations in association with BDEP permutations. In particular this allows re-use of existing right shifters to emulate a left shifter for BDEP operations on full word and double word sized data elements.

The control multiplexers that provide the control inputs to the various shifter circuits are implemented by the combination of OR and AND gates shown in FIGS. 7B to 7E.

Figure 7C:
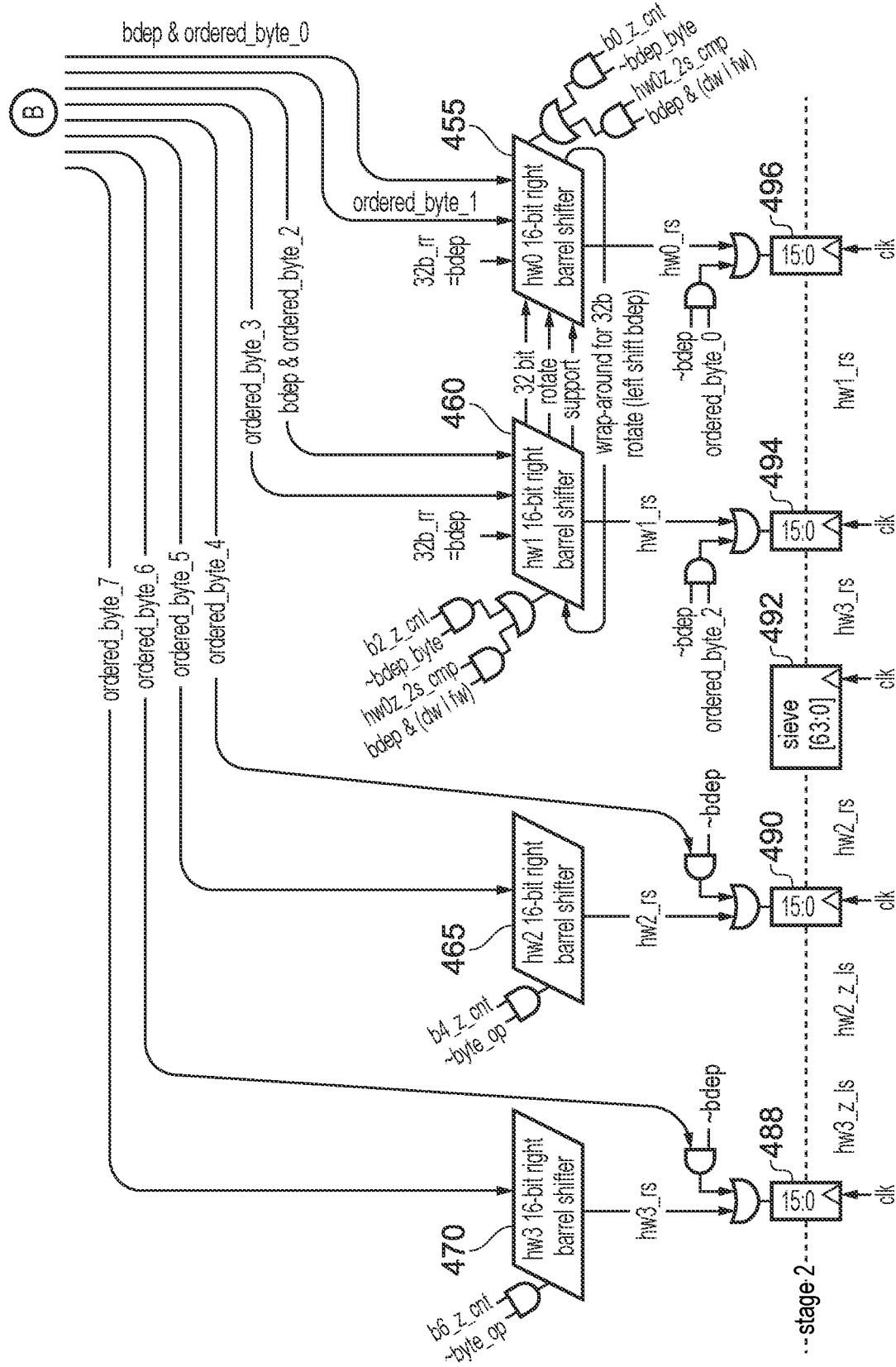

As shown in the lower half of FIGS. 7B and 7C, OR gates are provided at the inputs to the various storage elements shown at the end of stage 1, in order to allow a logical combination of a shifted and non-shifted intermediate result, this functionality being used when supporting BEXT and BGRP functions as discussed earlier by way of example with reference to the lower half of FIGS. 3A and 3B. When performing BDEP functions, this functionality is not used in association with the right shifters, or in connection with the high byte of the left shifters, but is used for the lower bytes of the left shifters.

As shown at the bottom of FIGS. 7B and 7C, the various outputs from the first level of shifter circuits, as logically combined by the OR gates, are stored in a series of storage elements 480, 482, 484, 486, 488, 490, 494, 496. In addition, the full sieve value is latched within the storage element 492 and, as also shown in FIG. 7B, various of the counters produced by the counter circuits 420 for byte sized data elements, half word sized data elements and full word sized data elements, along with the extra counters b654_cnt and b65_cnt produced for BDEP, are stored within the storage element 475.

Figure 7D:
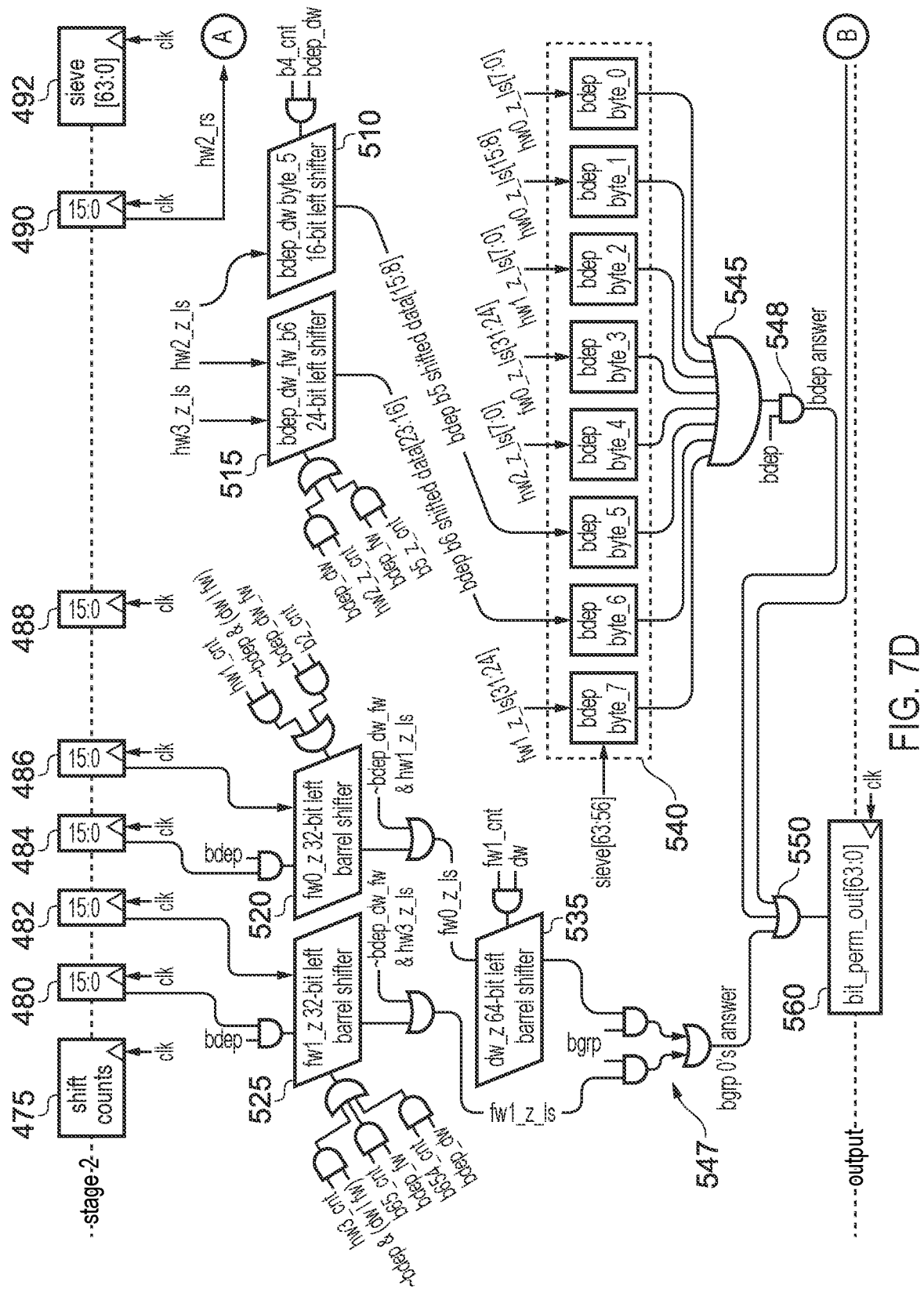
Figure 7E:
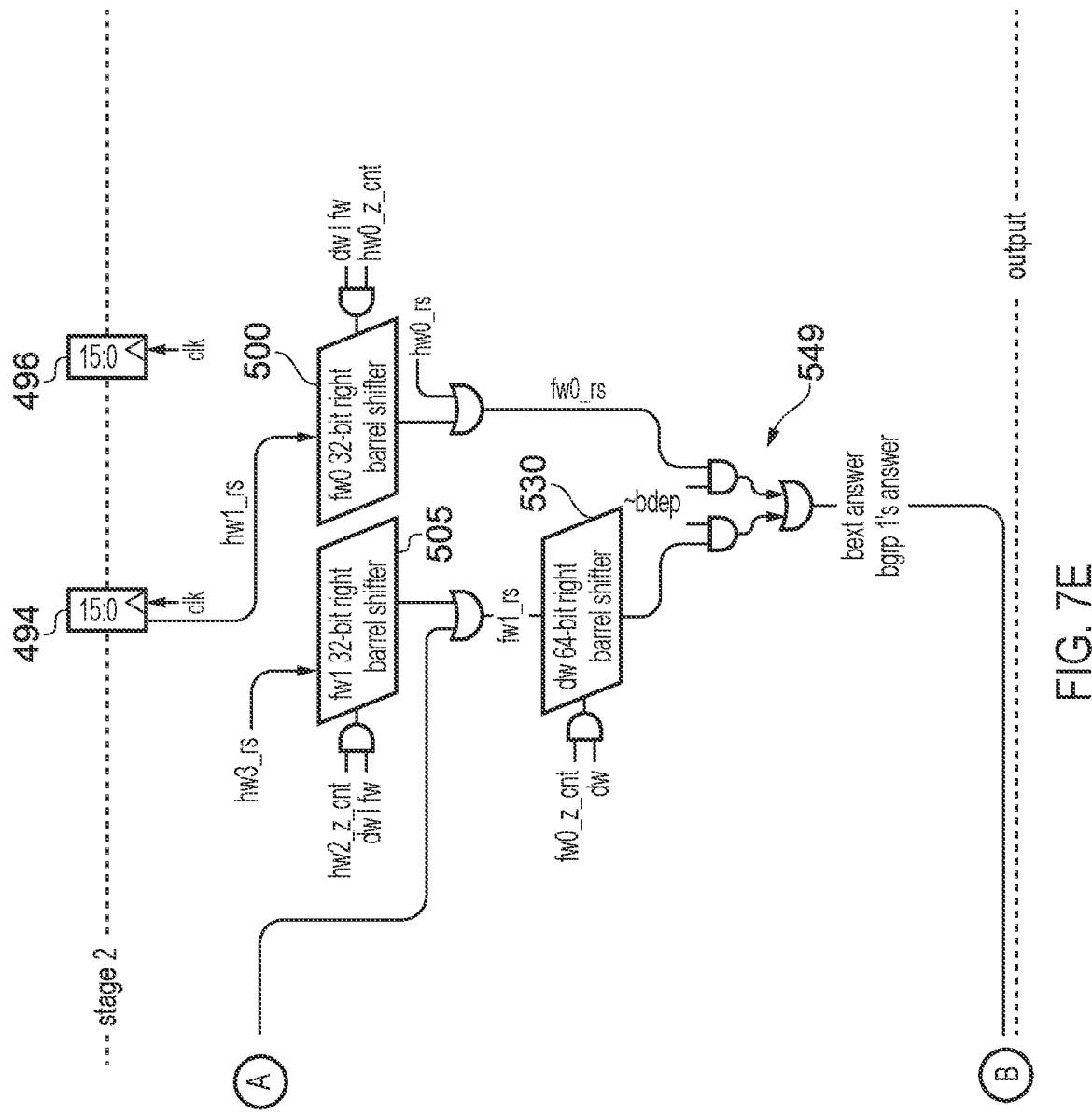

Whilst FIGS. 7A to 7C show the first level of the shifter circuits, the remaining levels of the shifter circuits are shown in FIGS. 7D and 7E, which illustrates execute stage 2 of the bit permute unit. In particular, a second level of the shifter circuit comprises the two full word left shifters 520, 525 and the two full word right shifters 500, 505. There are also some additional shifters 510, 515 used to support BDEP operations. The final level of the shifter network comprises the 64-bit left barrel shifter 535 and the 64-bit right barrel shifter 530. The outputs from the final stage of the shifter network can then be logically combined by the OR gate functionality 550 in order to produce the result operand stored within the register 560. This will provide individual result elements for each of the original data elements provided in the input data operand 400. For BGRP functions, the shifter network will have performed shift operations using the first and second intermediate results output by the ordered byte right shifters 415 and ordered byte left shifters 410 (for BEXT functions only the first intermediate results from the ordered byte right shifters will have been used) in order to reconstruct the required results taking into account the data element size, as discussed earlier with reference to FIGS. 3A and 3B.

In order to support BDEP functionality, the additional bit permute circuitry 55 of FIG. 1 can be implemented by the block 540 shown in FIG. 7D, comprising a plurality of BDEP byte processors. Each BDEP byte processor receives a corresponding portion of the sieve, and also receives a byte sized block of data. However, the form of the byte sized block of data that each BDEP processor receives is controlled by the operation of the shifter network based on the control signals output by the control circuitry, employing the principles discussed earlier by way of example with reference to FIG. 3C to ensure that each BDEP processor receives an appropriate input. The outputs from the various BDEP processors can then merely be concatenated by the OR gate 545 so that in the presence of a BDEP operation, the BDEP answer can be propagated out through the OR gate 550 to produce the result. When the BDEP operation is being performed, the outputs from the logic blocks 547, 549 driving the other inputs to the OR gate 550 are gated by being forced to all zero values so that they do not affect the BDEP result. Conversely, when performing BEXT or BGRP functions, the component 548 forces to zero the BDEP answer output from the component 545 so that it does not affect the result stored within the register 560.

For completeness, the following additional information is provided regarding the terminology of the signals shown in FIGS. 7A to 7E, and the resulting functionality.

In general, in FIGS. 7A to 7E the term "_z" post fix denotes a signal dealing with left shifting and zero bits identified by the sieve. Conversely, signals without the "_z" post fix generally deal with right shifters and one bits identified by the sieve.

The outputs from the ordered byte L/R_shifters are labelled "ordered_byte_#" for right shifting ordered bytes, and "ordered_b#_z" for left shifting ordered bytes (the term "z" being used because those outputs are based on zero value bits from the sieve).

The term "_ls" denotes a left shifter output, and "_z" shifters shift data left based on 0 values in the sieve. Similarly the term "_rs" denotes a right shifter output, and non "_z" shifters shift data right based on 1 values in the sieve.

The multiplexers that choose the shift amount input to the control shifters are illustrated as ORs of AND gates. One input is one of the population counters from the top left of FIG. 7A, and the other input is the gating term to allow the relevant population counter through to control the shifter or not.

The counters in the top left-hand corner of stage 1 shown in FIG. 7A are consumed by the aforementioned multiplexers controlling which population counter controls a shifter based on operations at hand (mostly bdep operations of various data element sizes vs not bdep). Control signals and counters needed in stage 2 are flopped at the end of stage 1.

A population counter's output is consumed by the shifter control multiplexers described above, but their connecting wires are not drawn to avoid diagram congestion. The first level of population counters count at byte granularity, and consist of two sets for for counting 1s and 0s in parallel. If extra delay was tolerable in a lower frequency design, twos complement could be used to serially obtain the 0s count from the 1s count.

The second level of population counters adds the first level to get counts of 0s and 1s for half words. The third level of population counters adds the second level to get counts of 0s and 1s for full words. The second and third level are sparse.

There are also provided bdep specific helper counters for is in sieve bytes 6, 5, and 4 (b654_cnt), and bytes 6 and 5 (b65_cnt), that are used in stage 2. The last bdep helper counter (hw0z_2s_cmp==hw0z_2cmp) facilitates the reuse and slaving together of existing right shifters hw0 and hw1 455, 460 as a 32-bit right rotator, which when controlled properly can be used as a left shifter. This rotator is used or muxed into the hw1_z flop for bdep functions at element sizes fw and dw, as hw1_z is busy helping with a large 64-bit shift for bdep dw for bdep processors 7, 6, 5, and 4. Hw 0's population count twos complemented is the amount of right rotate to emulate a left shift of the input data by zeroes in hw_0 (to feed bdep byte processor 2, or bdep processor 3 with the further shifting help of left shifter fw0_z in stage 2).

Considering BDEP support, for half word elements sizes the odd number BDEP byte processors must have input data shifted left by the number of 0s in the even byte below their sieve (on a half word granularity).

For full word element sizes, the above holds true for byte 1 and 5. Bytes 2 and 6 must have input data provided to them shifted left by the number of 0s in the 16 bits of sieve below them (sieve 15:0 and 47:32). Bytes 3 and 7 must have input data provided to them shifted left by the number of 0s in the 24 bits of sieve below them (sieve 23:0 and 55:32)

For double word element size, all bdep byte processors must have the input data string 63:0 delivered to them shifted left by the of 0s in the sieve's bytes below them. The following represents the shifts required to form the input data for each BDEP processor:
  Byte 0, no input data shift
  Byte 1, shift input data left by 0's in sieve byte 0
  Byte 2, shift input data left by 0's in sieve bytes 0, 1
  Byte 3, shift input data left by 0's in sieve bytes 0, 1, 2
  Byte 4, shift input data left by 0's in sieve bytes 0, 1, 2, 3
  Byte 5, shift input data left by 0's in sieve bytes 0, 1, 2, 3, 4
  Byte 6, shift input data left by 0's in sieve bytes 0, 1, 2, 3, 4, 5
  Byte 7, shift input data left by 0's in sieve bytes 0, 1, 2, 3, 4, 5, 6

For completeness, the following table provides further details as to how the BDEP support is provided for the various data element sizes, by way of example with reference to BDEP processor 7:
  ordered_byte right shifters output zero for bdep element size hw and byte
  ordered_byte right shifters output unaltered input data for bdep element size fw and dw
  ordered_byte_z left shifter output unaltered input data for all bdep element sizes

| step # | shifters used (sequential) | operation performed | element size |
|---|---|---|---|
| 1 | hw3_z | {ord_b7_z, ord_b6_z} not shifted (pass through), hw3_z high byte output flopped | byte |
| 2 | fw1_z 32-bit left shifter | flopped {hw3_z, hw2_z} not shifted (pass through), output high byte feeds bdep p7 | |
| 1 | hw3_z | {ord_b7_z, ord_b6_z} left shifted by zeroes in sieve[55:48], hw3_z output flopped | hw |
| 2 | fw1_z 32-bit left shifter | flopped {hw3_z, hw2_z} not shifted (pass through), output high byte feeds bdep p7 | |
| 1 | hw3_z <- hw2_z | {ord_b7_z through ord_b4_z} left shifted by zeroes in sieve[39:32], hw3_z & hw2_z output flopped | fw |
| 2 | fw1_z 32-bit left shifter | flopped {hw3_z, hw2_z} left shifted by zeroes in sieve[55:39], output high byte feeds bdep p7 | |
| 1 | hw3_z <- hw2_z <- hw1_z <- hw0p_z | {ord_b7_z through ord_b0_z} left shifted by zeroes in sieve[31:0], hw3_z & hw2_z output flopped | dw |
| 2 | fw1_z 32-bit left shifter | flopped {hw3_z, hw2_z} left shifted by zeroes in sieve[55:32], output high byte feeds bdep p7 | |

From the above description, it will be appreciated that the apparatus described herein provides a very efficient implementation of a bit permute unit that can support various bit permutation operations. The design described herein significantly reduces the size, and hence cost, complexity and power consumption, of a bit permute unit, whilst retaining a low logic depth, hence enabling the bit permute unit to operate quickly with low latency. In accordance with the specific example described, functions such as BEXT, BGRP and BDEP can be supported using an apparatus that only needs specialised hardware at the byte level, which scales nicely to the element size. A network of barrel shifters can then be used to assemble the larger element sized answers for BEXT and BGRP functions, or to shift the input data to a position that the byte level only BDEP hardware can then use to generate the appropriate results for BDEP operations.

The design shown also uses only minimal control logic, that can be operated in parallel to the initial bit permute blocks 410, 415 forming the bit permute circuitry 30. In addition, through use of the network of shifter circuits, logical depth can be reduced by eliminating the need for multiplexers and by simply directly connecting various shifters to each other and getting the control signals correct to enable them to pass data through if they are not needed for an operation, rather than requiring multiplexing.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   an interface to receive an input data operand and a control operand, the input data operand comprising one or more data elements, where each data element comprises a plurality of bits, and the control operand providing control information used to identify bit permutations required when performing a given bit permutation operation on each data element of the input data operand;
   bit permute circuitry arranged to treat the input data operand as a plurality of data portions of a fixed size, each data element comprising one or more of the data portions, and the number of data portions forming each data element being dependent on a size of the data elements in the input data operand, wherein the bit permute circuitry is arranged to perform at least one bit permutation operation on each data portion of the input data operand, using the control information provided by the control operand for that data portion, in order to generate, for each data portion, at least one intermediate result; and result generation circuitry to generate, from the intermediate results output by the bit permute circuitry, a final result operand comprising one or more result elements, where each result element provides the result of performing the given bit permutation operation on the corresponding data element of the input data operand;

wherein the result generation circuitry comprises a multi-level network of shifter circuits, where the shifter circuits at a first level of the network perform shift operations using as inputs at least a subset of the intermediate results, and the shifter circuits at each subsequent level of the network perform shift operations using inputs derived from the outputs of the shifter circuits at the preceding level of the network; and the apparatus further comprises control circuitry to analyze the control information provided by the control operand in order to generate control signals used to control the shift operations performed by the shifter circuits, wherein the control circuitry is arranged to produce at least one population count indication from the control information provided by the control operand for each data portion, and to use the population count indications to derive the control signals used to control the shift operations performed by the shifter circuits.

2. An apparatus as claimed in claim 1, wherein the control operand comprises a bit vector providing a control bit for each bit in the input data operand, and the population count indications identify, for each data portion, at least one of the number of control bits set to 1 and the number of control bits set to 0 in a corresponding portion of the bit vector.

3. An apparatus as claimed in claim 1, wherein the control circuitry is further arranged to produce, for at least one data element size comprising multiple data portions, at least one population count indication for the control information provided by the control operand for each block of adjacent data portions having that data element size.

4. An apparatus as claimed in claim 1, wherein the control circuitry operates in parallel with the bit permute circuitry.

5. An apparatus as claimed in claim 1, wherein the bit permute circuitry comprises multiple bit permute blocks operating in parallel, where each bit permute block is arranged to perform the at least one bit permutation operation on an associated one of the data portions.

6. An apparatus as claimed in claim 1, wherein the inputs to the shifter circuits at each subsequent level of the network are determined from the outputs of the shifter circuits at the preceding level of the network without any reordering of the bits of those outputs.

7. An apparatus as claimed in claim 1, wherein at each subsequent level of the network the input of each shifter circuit at that level is produced by an output of an OR circuit that receives as one of its inputs the output from one of the shifter circuits at the preceding level in the network.

8. An apparatus as claimed in claim 1, wherein the intermediate results produced as outputs by the bit permute circuitry and/or the outputs of the shifter circuits have any inactive bits set to 0 to facilitate combining of multiple of the outputs using OR logic circuitry.

9. An apparatus as claimed in claim 1, wherein the control circuitry is arranged to generate the control signals so as to enable one or more of the shifter circuits to perform no shift operation on its input.

10. An apparatus as claimed in claim 1, wherein the fixed size of each data portion is one byte.

11. An apparatus as claimed in claim 1, wherein:
the control operand comprises a bit vector providing a control bit for each bit in the input data operand; and
the given bit permutation operation is a bit group operation that comprises, for each data element, extracting from that data element the data bits whose associated control bit is set to a first value in the bit vector, outputting the extracted data bits in order within a number of least significant bits of the result element, further extracting from that data element the remaining data bits whose associated control bit is set to a second value in the bit vector, and outputting the remaining data bits in order within a number of most significant bits of the result element.

12. An apparatus as claimed in claim 11, wherein:
the bit permute circuitry is arranged to perform a first bit permutation operation on each data portion in order to extract from that data portion the data bits whose associated control bit is set to a first value in the bit vector, and to output the extracted data bits in order within a number of least significant bits of a first intermediate result generated for that data portion, and to perform a second bit permutation operation on each data portion in order to extract from that data portion the data bits whose associated control bit is set to a second value in the bit vector, and to output the extracted data bits in order within a number of most significant bits of a second intermediate result generated for that data portion; and
the control circuitry is arranged to control the shifter circuits so that each result element is generated from a number of the intermediate results, with that number being dependent on the data element size, and when each data element is formed of multiple data portions the multi-level network of shifter circuits is controlled by the control circuitry such that, for each data element, the extracted data bits from each of the multiple data portions forming that data element that were provided in the first intermediate results appear adjacent to each other within a number of least significant bits of the result element, and the extracted data bits from each of the multiple data portions forming that data element that were provided in the second intermediate results appear adjacent to each other within the remaining bits of the result element.

13. An apparatus as claimed in claim 12, wherein the multi-level network of shifter circuits comprises a first network to operate on the first intermediate results by performing right shifts, and a second network to operate on the second intermediate results by performing left shifts.

14. An apparatus as claimed in claim 1, wherein:
the result generation circuitry further comprises additional bit permute circuitry to support an additional bit permutation operation unsupported by the bit permute circuitry, the additional bit permute circuitry comprising a plurality of additional bit permute blocks that each operate on an input data block having the fixed size of the data portions;

when the apparatus is configured to perform the additional bit permutation operation, the bit permute circuitry is arranged to selectively output each data portion either unchanged, or zeroed, as the intermediate result for that data portion; and the control circuitry is arranged to control the multi-level network of shifter circuits so as to generate from the input operand, taking into account the data element size, the input data block for each additional bit permute block.

15. An apparatus as claimed in claim 14, wherein:

each additional bit permute block is associated with one data portion of the input data operand and is arranged to receive the control information provided by a portion of the control operand corresponding to that data portion; and each additional bit permute block is arranged to perform the additional bit permutation operation on its input data block, using the received control information.

16. An apparatus as claimed in claim 15, wherein the result generation circuitry is arranged to generate the final result operand for the additional bit permutation operation by concatenating together the outputs from each of the additional bit permute blocks.

17. An apparatus as claimed in claim 14, wherein:

the control operand comprises a bit vector providing a control bit for each bit in the input data operand; and the additional bit permutation operation is a bit deposit operation that comprises, for each data element, outputting in the corresponding result element, at each bit position whose associated control bit is set to a first value in the bit vector, a data bit from the data element, starting with a least significant bit of the data element, such that when there are N control bits set to a first value in the portion of the bit vector corresponding to the data element, the corresponding result element has the N least significant bits of the data element deposited in the bit positions of the result element identified by the N control bits set to the first value.

18. An apparatus as claimed in claim 17, wherein:

the control circuitry is arranged to control the multi-level network of shifter circuits so as to generate, for each additional bit permute block, an input data block comprising a data portion sized group of bits selected from the input data operand;

wherein, for each additional bit permute block, the first bit within the data portion sized group of bits provided as the input data block is determined dependent on the number of control bits set to the first value in the lower significant portions of the control operand than the portion of the control operand received by that additional bit permute block.

19. An apparatus comprising:

an interface to receive an input data operand and a control operand, the input data operand comprising one or more data elements, where each data element comprises a plurality of bits, and the control operand providing control information used to identify bit permutations required when performing a given bit permutation operation on each data element of the input data operand;

bit permute circuitry arranged to treat the input data operand as a plurality of data portions of a fixed size, each data element comprising one or more of the data portions, and the number of data portions forming each data element being dependent on a size of the data elements in the input data operand, wherein the bit permute circuitry is arranged to perform at least one bit permutation operation on each data portion of the input data operand, using the control information provided by the control operand for that data portion, in order to generate, for each data portion, at least one intermediate result; and result generation circuitry to generate, from the intermediate results output by the bit permute circuitry, a final result operand comprising one or more result elements, where each result element provides the result of performing the given bit permutation operation on the corresponding data element of the input data operand;

wherein the result generation circuitry comprises a multi-level network of shifter circuits, where the shifter circuits at a first level of the network perform shift operations using as inputs at least a subset of the intermediate results, and the shifter circuits at each subsequent level of the network perform shift operations using inputs derived from the outputs of the shifter circuits at the preceding level of the network; and the apparatus further comprises control circuitry to analyze the control information provided by the control operand in order to generate control signals used to control the shift operations performed by the shifter circuits;

wherein:

the shifter circuits at each subsequent level of the network are associated with a larger data element size than the shifter circuits at a preceding level of the network; and the control circuitry is arranged to generate the control signals taking into account the size of the data elements in the input data operand.

20. An apparatus comprising:

an interface to receive an input data operand and a control operand, the input data operand comprising one or more data elements, where each data element comprises a plurality of bits, and the control operand providing control information used to identify bit permutations required when performing a given bit permutation operation on each data element of the input data operand;

bit permute circuitry arranged to treat the input data operand as a plurality of data portions of a fixed size, each data element comprising one or more of the data portions, and the number of data portions forming each data element being dependent on a size of the data elements in the input data operand, wherein the bit permute circuitry is arranged to perform at least one bit permutation operation on each data portion of the input data operand, using the control information provided by the control operand for that data portion, in order to generate, for each data portion, at least one intermediate result; and result generation circuitry to generate, from the intermediate results output by the bit permute circuitry, a final result operand comprising one or more result elements, where each result element provides the result of performing the given bit permutation operation on the corresponding data element of the input data operand, wherein the result generation circuitry comprises a multi-level network of shifter circuits, where the shifter circuits at a first level of the network perform shift operations using as inputs at least a subset of the intermediate results, and the shifter circuits at each subsequent level of the network perform shift operations using inputs derived from the outputs of the shifter circuits at the preceding level of the network; and the apparatus further comprises control circuitry to analyze the control information provided by the control operand in order to generate control signals used to control the shift operations performed by the shifter circuits, wherein:

the control operand comprises a bit vector providing a control bit for each bit in the input data operand; and the given bit permutation operation is a bit extract operation that comprises, for each data element, extracting from that data element the data bits whose associated control bit is set to a first value in the bit vector, and outputting the extracted data bits in order within a number of least significant bits of the result element.

21. An apparatus as claimed in claim 20, wherein:

the bit permute circuitry is arranged to perform the bit extract operation on each data portion such that the extracted data bits appear in order within a number of least significant bits of the intermediate result generated for that data portion; and the control circuitry is arranged to control the shifter circuits so that each result element is generated from a number of the intermediate results, with that number being dependent on the data element size, and when each data element is formed of multiple data portions the multi-level network of shifter circuits are controlled by the control circuitry such that, for each data element, the extracted data bits from each of the multiple data portions forming that data element appear adjacent to each other within a number of least significant bits of the result element.

22. A method of performing bit permutation operations in an apparatus comprising:

receiving an input data operand and a control operand, the input data operand comprising one or more data elements, where each data element comprises a plurality of bits, and the control operand providing control information used to identify bit permutations required when performing a given bit permutation operation on each data element of the input data operand;

arranging bit permute circuitry to treat the input data operand as a plurality of data portions of a fixed size, each data element comprising one or more of the data portions, and the number of data portions forming each data element being dependent on a size of the data elements in the input data operand;

performing, using the bit permute circuitry, at least one bit permutation operation on each data portion of the input data operand, using the control information provided by the control operand for that data portion, in order to generate, for each data portion, at least one intermediate result;

performing a result generation operation to generate, from the intermediate results output by the bit permute circuitry, a final result operand comprising one or more result elements, where each result element provides the result of performing the given bit permutation operation on the corresponding data element of the input data operand;

employing a multi-level network of shifter circuits during the result generation operation, where the shifter circuits at a first level of the network perform shift operations using as inputs at least a subset of the intermediate results, and the shifter circuits at each subsequent level of the network perform shift operations using inputs derived from the outputs of the shifter circuits at the preceding level of the network; and analyzing the control information provided by the control operand in order to generate control signals used to control the shift operations performed by the shifter circuits, wherein the analyzing of the control information produces at least one population count indication from the control information provided by the control operand for each data portion, and the population count indications are used to derive the control signals used to control the shift operations performed by the shifter circuits.

* * * * *